Patented Jan. 13, 1931

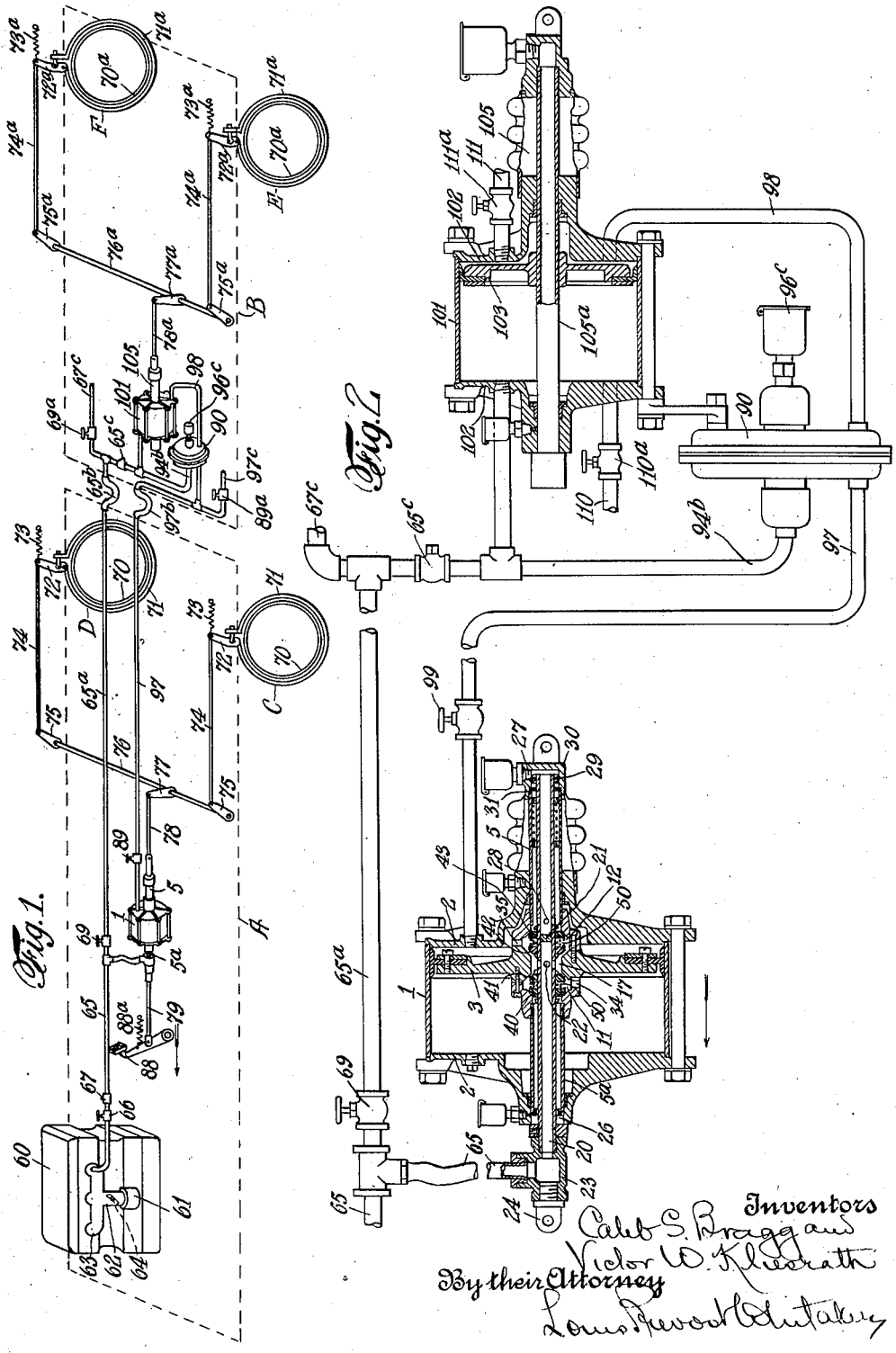

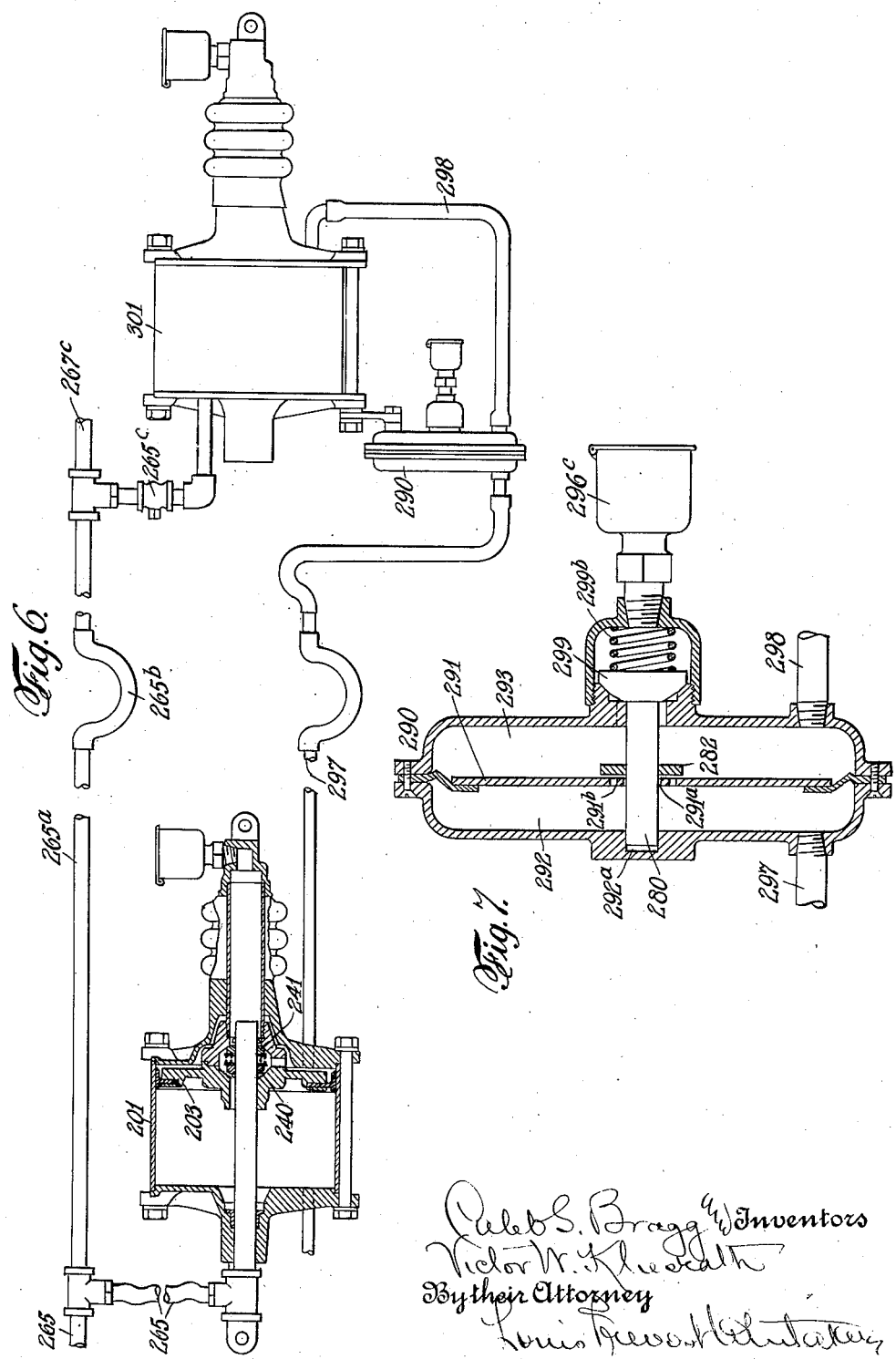

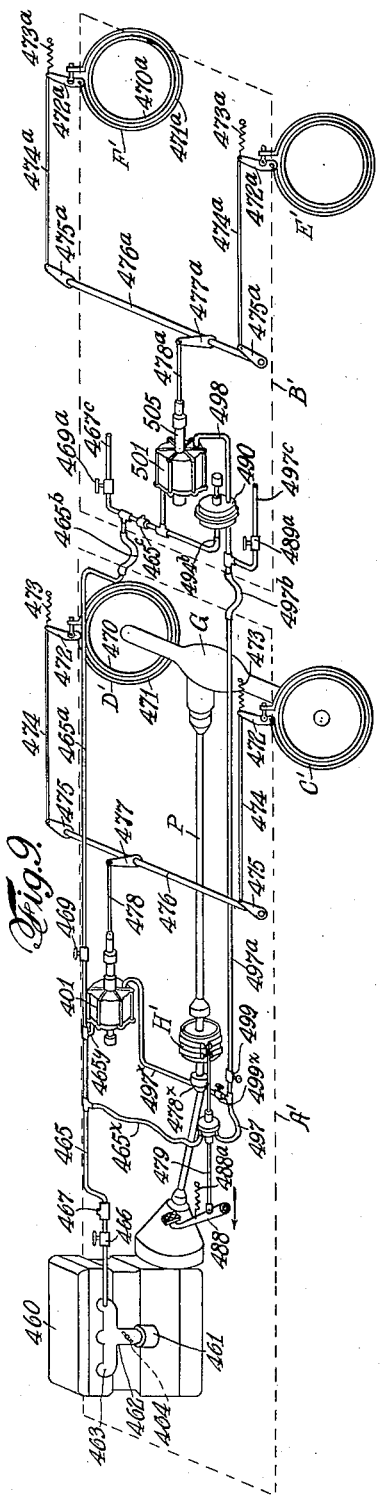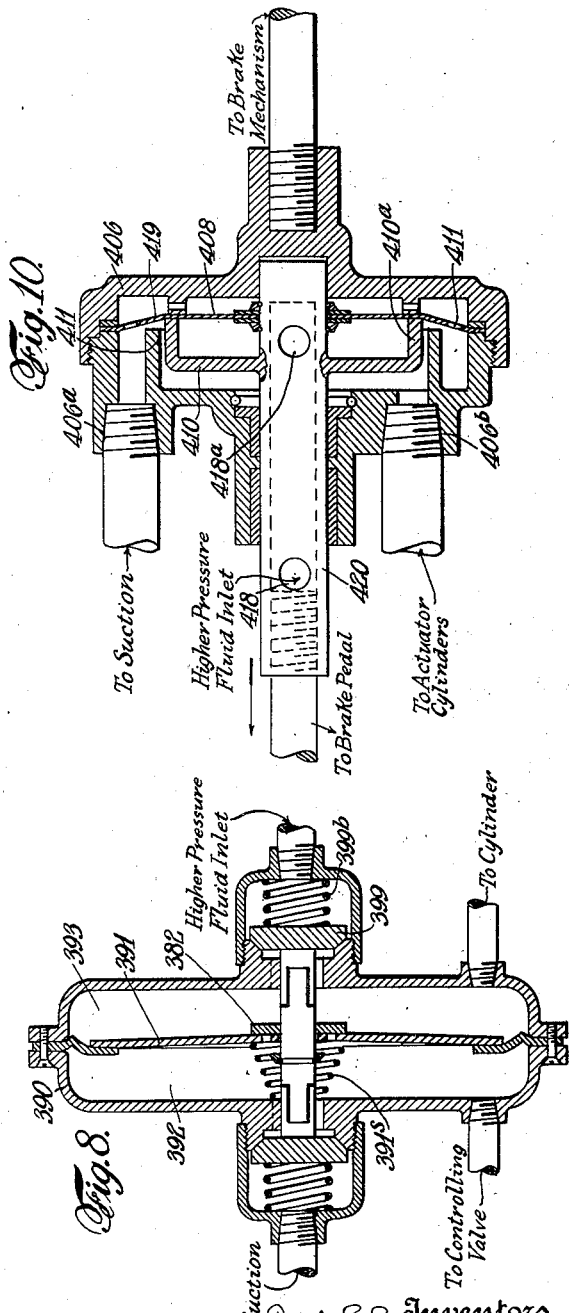

1,788,379

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE MECHANISM FOR AUTOMOTIVE VEHICLES

Application filed December 28, 1927, Serial No. 243,005. Renewed October 16, 1929.

Our invention consists in the novel features hereinafter described, reference being had to the accompanying drawings which illustrate two embodiments of the same, selected by us for purposes of illustration, and the said invention is fully disclosed in the following description and claims.

The object of our invention is to provide, in connection with independently operable brake mechanisms of an automotive vehicle, or of an automotive vehicle and a trailing vehicle or vehicles, a main power actuator for operating one set of brake mechanisms provided with main controlling valve mechanism, and an auxiliary power actuator, or actuators, operatively connected with the main power actuator by means including a pressure operated device located adjacent to the auxiliary actuator or actuators, having a movable pressure operated part for operating a valve, or valves, controlling independent connections between the auxiliary actuator or actuators, and one or both of the sources of higher and lower fluid pressures, to effect a substantially simultaneous application under equal fluid pressures of the several brake mechanisms controlled by both or all of the actuators, by the operation of the main controlling valve mechanism, without the lag or delay in the operation of the auxiliary actuator or actuators, which is, or are, located at a considerable distance from the main actuator or its valve mechanism, and connected therewith by piping.

Our invention is especially adapted for use in brake systems controlled by a valve mechanism located within or adjacent to the main actuator cylinder, and obviously a valve mechanism suitable for the control of the master actuator alone, will not have sufficient capacity to operate additional actuators. When the actuators are operated by the vacuum in the suction passage of an internal combustion engine as the source of lower pressure, and atmospheric pressure as the higher fluid pressure, the maximum differential of fluid pressures rarely exceeds ten pounds (or the equivalent of twenty inches of mercury) and the passage of air through connecting pipes of normal diameters is very slow. It would be extremely ineconomic and otherwise undesirable and commercially impracticable to attempt to meet this situation by making the valve mechanism of the master actuator of different capacities, according to the number of actuators to be controlled, and it is equally undesirable to employ connecting pipes of great size and capacity which would be objectionable both on account of their size and weight and for the further reason that the exhaustion of the large quantity of air which such pipes would contain, into the suction passage of the engine would increase the danger of stalling the engine, while the use of a restricting means between such pipes and the suction passage to prevent stalling the engine would slow down the passage of air through the pipes and neutralize any benefit obtainable from their increased size. According to our invention, the movable pressure operated part, preferably a diaphragm, is instantly responsive to variations in pressure in the main actuator, and is operated to effect an instant and corresponding actuation of the valve or valves of the pressure operated device, whenever the valve mechanism of the main actuator is operated, thus eliminating the lag or delay in the operation of the auxiliary actuators and enabling the operator to apply all of the independently operable brake mechanisms substantially simultaneously and equally, though the actuators may be widely separated and the connecting pipes relatively long. Our invention, therefore, permits the rapid and simultaneous operation of all power actuators, without the use of oversize valves or pipes which increase the danger of stalling the motor, and furthermore, permits a quicker release of the brakes by causing an equalization of pressures within the cylinders and a subsequent withdrawal of the air in such quantities as will not stall the motor and the brakes may be instantly re-applied, although without the maximum differentials of pressures at the first instant of reapplication, where the pressures will rapidly build up as the air is withdrawn into the manifold.

Our invention also comprises certain novel features of construction and combination of parts hereinafter fully described and particularly pointed out in the claims.

Referring to the accompanying drawings,

Fig. 1 represents an installation of brake mechanism and actuating means therefor in an automotive vehicle and trailer propelled thereby, and embodying our invention.

Fig. 2 is an enlarged view, partly in section, showing the main actuator and the auxiliary actuator illustrated in Fig. 1, the pressure operated device and their pipe connections.

Fig. 6 is a view similar to Fig. 2, illustrating a slight modification of our invention.

Fig. 7 is an enlarged sectional view of the pressure operated device shown in Fig. 6.

Fig. 8 is a view similar to Fig. 3, showing a slight modification of the pressure operated device.

Fig. 9 is a diagrammatic view similar to Fig. 1, showing a modified embodiment of our invention.

Fig. 10 is a detail sectional view of the exterior controlling valve mechanism illustrated in Fig. 9.

Figure 3:
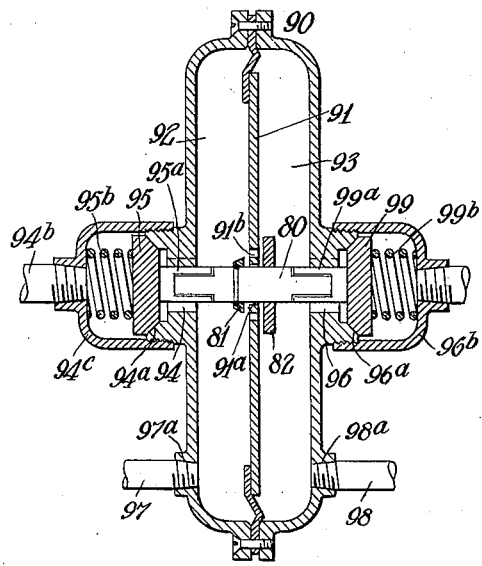
Fig. 3 is an enlarged sectional view of the pressure operated device illustrated in Figs. 1 and 2, showing the parts in the position which they occupy when the fluid pressures on opposite faces of the movable pressure operated part are equalized.

In the diagrammatic view, Fig. 1, the main or propelling vehicle indicated at A, by dotted lines, is provided with an internal combustion engine for propelling it, indicated at 60, and having a carburetor, 61, a suction passage, 62, extending therefrom and including the manifold, 63, the suction passage being provided with the usual throttle valve, indicated at 64. The main vehicle is shown provided with suitable brake mechanism which may be applied to two or more of its separating wheels, and which may be of any desired character. We have shown brake mechanisms, C and D, each comprising a drum, 70, brake band, 71, operating lever, 72, and retracting spring, 73, which may be, for example, the brake mechanisms for the rear wheels of the main vehicle, and the brake levers, 72, are shown connected by link, 74, with arms, 75, on a rock shaft, 76, provided with an arm, 77, by means of which brakes may be simultaneously applied. The main vehicle is also shown provided with a main power actuator adapted to be operated by suction and atmospheric pressure, as the higher and lower pressure sources, and we have illustrated as the preferred form of said main actuator a power actuator constructed as shown in our prior application for Letters Patent of the United States filed October 2, 1925, and given Serial No. 60,018. The particular construction of the power actuator and of the operator operated valve mechanism therefor forms no part of our present invention and is not particularly claimed herein, and will only be described insofar as is necessary to an understanding of our present invention. The main power actuator comprises a cylinder, 1, closed at both ends by heads, 2, and provided with a piston, 3, and controlling valve mechanism located in this instance in the hub of the piston. The piston is shown provided with oppositely extending piston rods, 5 and 5$^a$, extending through stuffing boxes in the opposite heads of the cylinder, the piston rod, 5, being connected by link, 78, with the arm, 77, of the brake mechanism to be operated thereby.

The piston is provided with a suction chamber, 17, and with valve chambers, 11 and 12, located on opposite sides of said chamber, each valve chamber containing two oppositely disposed valves, said valves being indicated at 40, 41, 42 and 43, of which 41 and 42 are the suction valves, while 40 and 43 are the air inlet valves. Interposed between the valves of each pair are yielding devices, indicated at 50, normally tending to seat said valves. The valves are preferably made of molded cork or rubber having central openings which engage a longitudinally movable valve actuating sleeve, 20, extending through both piston rods and the hub of the piston, the valves engaging said sleeve so as to make a tight joint, while permitting the movement of the valve sleeve therethrough. The valve sleeve is provided with a collar to engage each valve, and so arranged that a movement of the sleeve in either direction will open one valve of each pair after the other has closed, compressing the intervening yielding device, 50. The valve collars are so spaced on the valve rod, 20, that both inlet valves, 40 and 43, may be seated at the same time, but both suction valves, 41 and 42, cannot be seated at the same time. The piston hub is also provided with a port or ports, 34, connecting the valve chamber, 11, with the cylinder, forward of the piston, and the port or ports, 35, connecting the valve chamber, 12, with the cylinder in rear of the piston. The valve mechanism is also connected with a source of suction, as the intake manifold of the internal combustion engine, and with the atmosphere. In this instance the valve sleeve is shown provided with a plug, 21, forward of which are apertures, 22, connecting the interior with the suction chamber, 17, and the outer end of the valve sleeve, 20, is provided with a fitting, 23, connected by a suction pipe, 65, a portion of which is flexible, with the intake manifold of the engine, between the throttle valve and the cylinder. This fitting is also provided with an ear, 24, for connecting it by means of a link, 79, of the pedal lever, 88, or other operator operated part, provided with the usual retracting spring, 88$^a$. The valve actuating sleeve, 20, is also provided with a stop collar, adjustable thereon, and adapted to engage the adjacent head of the cylinder so as to hold the suction valves, 41 and 42, in open position when the piston is in retracted position, as shown in Fig. 2, thus connecting the cylinder on both sides of the piston with the suction pipe, 65, and maintaining the piston normally submerged in vacuum. Atmospheric air can be admitted to the cylinder on either side of the piston under the control of the valves, 40 and 43, the air entering through suitable apertures at the outer end of the piston rods, 5 and 5$^a$, at points indicated at 26 and 27, and the valve sleeve is also provided with apertures, 28, in rear of the plug, 21, to facilitate the admission of air to the valve, 43. Means are also preferably provided for connecting the foot lever with a brake mechanism operated by the actuator, and such means preferably include a provision for sufficient lost motion to secure the proper operation of the valve so that when this lost motion is taken up, the physical force of the operator can be applied to the brake mechanism in addition to the power of the actuator, and can also be applied to positively actuate the brake mechanism in case of failure of power. In this instance the valve actuating sleeve, 20, is shown provided with a collar, indicated at 29, and located between the outerwall of a recess in a cap, 30, secured to the piston rod, 5, and an inwardly extending collar or flange, 31, secured to said piston rod, so that a movement of the valve sleeve, 20, in either direction after the lost motion so provided is taken up, will move the piston correspondingly.

The suction pipe, 65, is preferably provided with an adjustable restricting valve, 66, for restricting the passage of air into the intake manifold, and with a check valve, 67, for insuring within the actuator and suction pipe, 65, the maximum rarification obtained in the manifold.

E and F represent independently operable brake mechanisms, which, as indicated in Fig. 1, are located on a trailing vehicle, indicated in dotted lines at B, propelled by the main vehicle, although it is to be understood that they might be located on a part of the main vehicle and operated in the same manner as hereinafter described. It is also to be understood that while we have only shown herein, in Fig. 1, a main vehicle and a single trailer, the apparatus shown in connection with the trailer (or independently operated set of brake mechanism) can be duplicated on other trailers, the auxiliary actuators of which can all be simultaneously operated from the main or master actuator, by extending the connecting pipe lines, as indicated.

The auxiliary brake mechanisms may be of any desired kind, and may be applied to as many wheels as desired. For purposes of illustration we have shown each of the brake mechanisms, E, F, as comprising a brake drum, 70$^a$, brake band, 71$^a$, brake lever, 72$^a$, and retracting spring, 73$^a$, the brake lever, 72$^a$, being connected by link, 74$^a$, with arms, 75$^a$, on a rock shaft, 76$^a$, provided with an operating arm, 77$^a$, to which the auxiliary actuator hereinafter described, is operatively connected. The auxiliary actuator is illustrated in section in Fig. 2, and comprises a cylinder, 101, closed at both ends, by the heads, 102, and provided in this instance with a single acting piston, 103. The piston, 103, is provided with a hollow piston rod, 105, extending through a stuffing box in one end of the cylinder, and provided at its outer end with a fitting having a lug to which the arm, 77$^a$, is connected, by link, 78$^a$. The piston, 103, is also desirably provided with a piston rod, 105$^a$, extending through a stuffing box in the other head of the cylinder for assisting in guiding the piston. At the point preferably closely adjacent to the auxiliary actuator is located a fluid pressure operated control device for controlling the auxiliary actuator under the influence of the main controlling valve mechanism of the main or master actuator. This device, which is best ilustrated in Figs. 3, 4 and 5, comprises a hollow main body or casing, 90, preferably formed in two halves secured together upon the marginal edges of a diaphragm, 91, which divides the interior of the casing in two chambers, 92 and 93. The diaphragm may be of metal, rubber, a combination of rubber and fabric, or other suitable material, having its marginal portions in sealing engagement with the casing, 90, and its central portion capable of movement within the casing. The portion of the casing adjacent to the chamber, 92, is provided with a suction aperture, 94, having a valve seat, 94$^a$, to receive a suction valve, 95, the stem, 95$^a$, of which extends into the chamber, 92. The aperture, 94, is connected when the valve 95, is opened, with the main suction pipe, 65 and 65$^a$, by means of a pipe, 94$^b$, in this instance connected to a cap, 94$^c$, screwed on to a threaded portion of the casing surrounding the aperture, 94, and containing a retracting spring, 95$^b$, which engages the valve, 95, in a direction tending to seat it. The casing, 90, is also provided with an aperture, 97$^a$, which is connected by a pipe, 97, with the cylinder of the main or master actuator, in rear of the piston therein. The casing, 90, on the other side of the diaphragm, 91, is provided with an inlet aperture, 96, for air or other higher pressure fluid, having a valve seat, 96a, engaged by an air inlet valve, 99, the stem 99a, of which extends into the casing. This portion of the casing is also preferably provided with a cap, 96b, connected in this instance with an air cleaning device, 96c, and containing a spring, 99b, which normally tends to seat the air inlet valve, 99. This portion of the casing is also provided with an aperture 98a, which is connected by a pipe, 98, with the auxiliary cylinder in rear of the piston therein. The diaphragm, 91, is provided with means for operatively connecting it with the valves, 95 and 99, in such manner as to effect the opening of one valve after permitting the other to close, by movement of the diaphragm in either direction, and to permit both valves to be closed simultaneously. In this instance the diaphragm is shown provided with a central aperture, 91a, through which extends a rod, 80, having its end portions connected with the valve stems of the suction and air inlet valves in such manner as to unseat either valve by a movement toward the valve, but permitting the movement of the rod away from either valve, the rod, 80, permitting both valves to be simultaneously seated. This rod is provided on one side of the diaphragm with a collar, indicated at 81, and on the other side with a by-pass valve, 82, adapted to control one or more by-pass apertures, 91b, in the diaphragm, which when not closed by said valve, 82, establish communication between the chambers, 92 and 93, on opposite sides of the diaphragm. The distance between the by-pass valve and the collar, 81, permits a certain amount of lost motion between the diaphragm and the rod, 80, and in the normal position of the device illustrated in Fig. 3, the by-pass apertures are opened and the chambers, 92 and 93, are therefore, in communication.

The cylinder of the auxiliary actuator forward of the piston is connected by a suction pipe, 65a, with the main suction pipe, 65, so that the portion of the auxiliary actuator cylinder forward of the piston is always connected with the intake manifold and a state of rarification is maintained therein at all times, and may be connected with the pipe, 94b, of the control device, as shown in Fig. 1. The connecting pipes, 97 and 65a, will be provided with flexible connections extending from one vehicle to the other where the auxiliary actuator is located on a trailer, such flexible connections being connected in Fig. 1 at 97b and 65b. In Fig. 1 we have shown, at 69 and 89 respectively, cut-off valves for closing off the pipes 65a and 97, respectively, when the trailer, for example, is disconnected from the main vehicle. We have also shown the trailer, B provided with pipe extensions 97c and 67c, of the pipes 97 and 65a, respectively, which may be connected with another power actuator, as one located on a second trailer, for example, provided with brake mechanism and constructed and operating in the same manner as shown in connection with the trailer, B, the said extension pipes being provided with cut-off valves, 69a and 89a, respectively, so that they may be cut off when the additional actuator or second trailer is not used. We also prefer to provide the suction pipe, 65a, with a check valve, 65c, opening in a direction toward the manifold, so that if the trailing vehicle should become detached from the main vehicle and the connecting pipe ruptured, the check valve would maintain rarification in the cylinder of the auxiliary actuator forward of the piston, and air would be admitted to the pipe, 97, and as hereinafter described, operate the control device, 90, so as to admit air to the auxiliary actuator in rear of the piston and apply the brakes of the trailer. The control device and the auxiliary cylinder are both connected with the main suction pipe, 65 and 65a, and the check valve, 65, is preferably located in the pipe, 65a, so that communication is maintained between the auxiliary control device and the forward end of the auxiliary cylinder, in both directions through pipes, 94b and portion of 65a.

Assuming that the parts are arranged as shown in Fig. 1, and as previously described, and that the internal combustion engine is in operation, the air will be exhausted from the main actuator cylinder on both sides of the piston, through the suction pipe, 65. Air will also be exhausted in the forward end of the auxiliary actuator cylinder (or cylinders) through the suction pipe, 65a. As the rear end of the main cylinder is connected with the chamber, 92, of the control device, this pipe, and the chamber, 92, will be exhausted, tending to flex the diaphragm in a direction toward the suction valve, 95, and away from the by-pass valve, 82, opening the valve, 95, which places the rear end of the auxiliary cylinder in communication with the front end and with the suction pipe, 65 and 65a, through the pipe, 98, aperture, or apertures 91b, passage, 94, and pipes 94b and 65a, and effects an equalization of pressures on opposite faces of the auxiliary piston, and the exhaustion of air from the auxiliary cylinder on both sides of its piston. When the pressures are approximately equal on opposite faces of the diaphragm, 91, the suction valve, 95, will close, under the tension of spring, 95b, and thereafter any air remaining in the auxiliary cylinder in the rear of the piston will be withdrawn through the by-pass aperture or apertures, 91b, and the pipe, 97, into the suction passage of the engine through the main actuator cylinder and suction pipe, 65.

If the operator desires to apply the brakes, he will depress the operator operated part, in this instance the foot lever, 88, connected with the valve mechanism of the main actuator, shifting the valve actuating sleeve forward, in the direction of the arrow, Figs. 1 and 2, opening the suction valve, 41, further, closing the suction valve, 42, and thereafter opening the air in inlet valve, 43, of the main actuator. Atmospheric air is therefore admitted to the rear end of the master cylinder in the rear of the piston and to the chamber, 92, of the control device through the connecting pipe, 97, increasing the pressure in that chamber and flexing the diaphragm in a direction toward the air inlet valve, 99, closing the by-pass, or by-passes, 91b, as the diaphragm moves into contact with the by-pass valve, 82, and thereafter opening the air inlet valve, admitting air (or other higher pressure fluid) which passes directly through the chamber, 93, and pipe, 98, to the auxiliary actuator cylinder in rear of the piston. Both main and auxiliary pistons will be moved as the relatively small quantity of air required to maintain the pressure forward substantially simultaneously within the chamber, 92, equal with that in the main cylinder to the rear of the piston, will quickly pass through the pipe, 97, and as long as the operator continues to advance the foot pedal, the valve actuating sleeve, 20, of the main actuator, maintaining the inlet valve, 43, open, and the brake mechanisms connected with said pistons will be applied by substantially equal differentials of fluid pressures. It will be seen that the atmospheric air (or other higher pressure fluid) which operates the auxiliary actuator piston instead of having to enter the main actuator cylinder, through the operator controlled valve mechanism, and be transmitted through an intervening pipe connecting to the auxiliary actuator cylinder, enters the auxiliary actuator cylinder through the air inlet valve, 99, of the control device, closely adjacent to the auxiliary cylinder, thus obviating any material lag in the operation of the auxiliary actuator and the brake mechanism connected therewith, which would otherwise occur to a greater or less extent, unless a very large operator operated valve mechanism and very large piping were used, which, in addition to the extra cost and weight, would have considerable air capacity, which air would have to be withdrawn into the suction passage of the engine in addition to the air within the cylinders. As only a limited amount of air may be admitted to the suction passage without stalling the engine, if idling, the air has to be withdrawn slowly, and the withdrawal of this additional air would cause a further lag in the return of the parts to the normal or off position, and recharge the cylinders with the lower pressure fluid for the next application of the brakes.

The apertures, 91b, must have their combined areas substantially equal to the cross sectional area of the pipe, 98, as they constitute the only passageway for the air withdrawn from the auxiliary cylinder in rear of the piston. Where the parts occupy the relative positions shown in Fig. 3, it would be possible to admit air to the main actuator in rear of its piston very slowly and gradually for the purpose of effecting a slow application of the brakes and to have the air pass gradually through the pipe, 97, into the chamber, 92, and through the apertures, 91b, to the auxiliary cylinder in rear of the piston without flexing the diaphragm. This would not be objectionable, because on making a very slow and gradual application of the brakes, the element of time would not be important and the main valve mechanism and the piping between the actuators is sufficiently large to take care of a slow application of the brakes by the auxiliary actuator cylinder, but when a quick application of the brakes is to be effected the air is admitted to chamber, 92, through the pipe, 97, sufficiently rapid to flex the diaphragm. It will also be noted that although the apertures, 91b, are substantially equal in their combined areas to the area of pipe, 98, the normal position of the diaphragm and its proximity to the valve, 82, is such that this valve restricts the flow of air between the chambers of the pressure operated device to a greater or less extent, according to the relative positions of the diaphragm and the valve, 82, when in the normal or released position, indicated in Fig. 3, and this restriction is such that pressure will accumulate in the chamber, 92, whenever air is admitted thereto through the pipe, 97, rapidly or in appreciable quantities.

As soon as the forward movement of the operator's foot ceases, the continued forward movement of the main actuator piston, 3, will shift it slightly with respect to the valve actuating sleeve, permitting the air inlet valve, 43, to close. This stops the forward movement of the main actuator piston, holding the brakes controlled thereby, as applied. As soon as the main actuator air inlet valve, 43, closes, the slightest continued admission into chamber, 93, of the control device of air will equalize pressures on opposite sides of the diaphragm and permit the inlet valve, 99, to close, thus holding the brakes controlled by the auxiliary actuator as applied, with fluid pressures equal to those of the master actuator.

Figure 5:
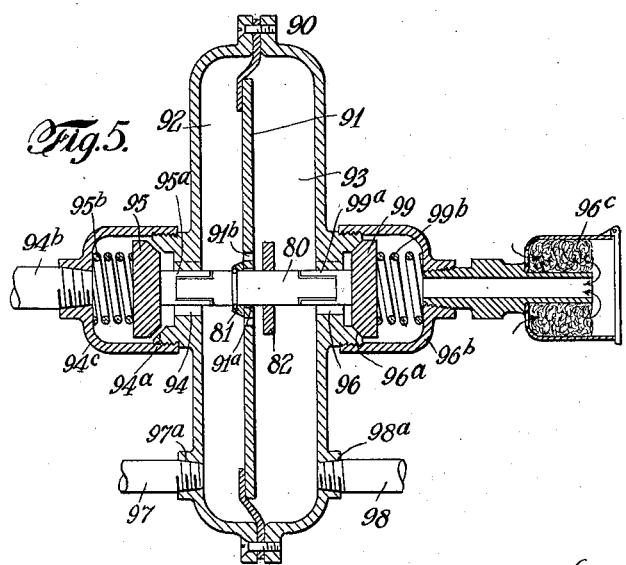
Fig. 5 is a similar view showing the position of the parts when the pressure in the chamber connected with the main actuator cylinder is below that in the other chamber.

The operator can release both sets of brake mechanisms by slightly releasing his pressure on the pedal of the main actuator sufficiently to open the suction valve, 42, without closing the suction valve, 41, thus connecting the main actuator on both sides of the piston with the suction passage. The consequent reduction of pressure in the main actuator cylinder in rear of the piston will be instantly transmitted to the chamber, 92, of the control device, 90, flexing the diaphragm in a direction toward the suction valve, 95, and away from the by-pass valve, 82, opening the by-pass aperture, or apertures, 91b, and if the differential of pressures on the opposite faces of the diaphragm are not instantly equalized, the diaphragm will effect the opening of the suction valve, 95, as shown in Fig. 5. Air will be withdrawn from the rear of the auxiliary cylinder through the pipe, 98, apertures, 91b, open valve, 95, and the pipe, 94b, and this air will cause a momentary reduction of the degree of rarification in the connecting pipes, 65 and 65a, and also within the auxiliary cylinder forward of the piston, in the same manner and at the same time as the differentials of pressures were similarly reduced in the master cylinder by momentarily connecting both ends of the main cylinder with each other and with the suction pipe. When the apertures, 91b, are open, communication is established between the rear ends of both cylinders, and when the valve, 95, is open, both ends are connected with the source of suction, which effects an equal reduction of pressures within said portion of the cylinder, and when pressures are approximately equal therein and also in the chambers, 92 and 93, the spring, 95b, will close the suction valve, 95. This permits both sets of brakes to instantly relieve themselves to the same extent, and thereafter hold the brakes as applied, with the reduction of pressure differentials. The operator can apply the brakes with greater pressure where a further application is desired, by pressing the pedal lever further forward.

When the operator desires to release the brakes altogether, he will remove his foot from the pedal lever, allowing it to be retracted by its spring, 89, for example, shifting the valve actuating sleeeve in a direction opposite to that indicated by the arrows, Figs. 1 and 2, and further opening the suction valve, 40, and closing the suction valve, 41, and opening the air inlet valve, 40, of the main actuator. This admits air into the cylinder, 1, of the main actuator on the forward side of the piston, and connects the cylinder in the rear of the piston, also the pipe, 97, and the chamber, 92, with the suction passage of the engine, causing a simultaneous reduction of pressures, which will flex the diaphragm, so as to open the by-pass aperture or apertures, 91b, and the suction valve, 95, causing air to be exhausted, as previously described. As soon as the pressures are approximately equalized in the rear ends of the cylinder and on opposite sides of the diaphragm, 91, of the control device, it will permit the suction valve, 95, to close, and if this valve closes before the last portion of air in the rear of the piston, 103, is exhausted, the same will be withdrawn from the by-pass aperture or apertures, 91b, and the pipe, 97, leading to the main actuator from the rear of the piston, which is connected with the suction passage, 63, of the engine when the operator operated valve mechanism is in the released or off position. The by-pass aperture, or apertures, 91b, permit the withdrawal of air from the rear of the auxiliary cylinder into the rear of the main cylinder, when the differentials of pressures on opposite faces of the diaphragm are not sufficient to compress the spring, 95b, and open suction valve, 95. The sides of the diaphragm are purposely made sufficiently large that this differential of pressure is less than one inch of mercury when the device is operated by partial vacuum or air at atmospheric pressure, but the diaphragm in its normal position does not close the apertures, 91b, so that any air leaking into the auxiliary cylinder which will not materially interfere with the operation of the cylinders or interfere with the carburetion of the engine while idling, will pass through the apertures and into the suction passage by way of the main cylinder. The piston, 3, of the main actuator, which in this instance is double acting, is positively returned to normal position when the operator operated valve mechanism is in the released position, while the piston, 103, of the auxiliary actuator, which is single acting, is returned to normal position by the draft of the brake mechanisms and their retracting means.

It will be seen that by the operation of our invention, both of the independently operated brake mechanisms are applied practically simultaneously and at equal pressures, and the lag which would otherwise be experienced in the operation of the auxiliary actuator, if air for operating its piston had to be transmitted through a pipe connection from the master cylinder, is obviated. It will be understood that any lag in the operation of the brakes of a trailing vehicle is objectionable, as it increases the distance within which the vehicle can be brought to a stop and also causes the trailing vehicle to run up on the tractor or propelling vehicle, which may result in accidents, causing the vehicles to jack-knife. It is also to be understood that in carrying our invention into effect the main and auxiliary actuator cylinders and pistons will be of the proper size and scope, and the leverages between each piston and its brake mechanisms will be such that the operation of the actuators by the same differentials of fluid pressures will effect the desired braking forces of the several braking mechanisms.

Figure 4:
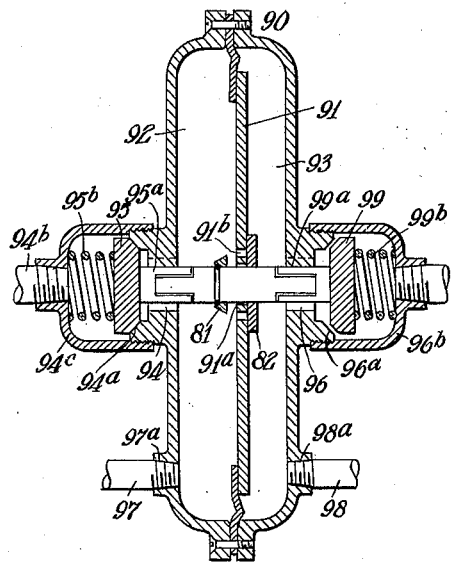
Fig. 4 is a similar view showing the positions of the parts when the pressure in the chamber connected with the main actuator cylinder is in excess of that in the other chamber.

While we have shown in Figs. 1 and 2 an embodiment of our invention in connection with a main or master actuator, in which the piston is double acting, it is to be understood that it may also be embodied in connection with a main or master actuator in which the piston is single acting, provided that the piston is normally maintained submerged in vacuum. Such an embodiment of our invention is illustrated in Fig. 6, in which we have shown a slight modification of the pressure actuated control device illustrated in detail in Fig. 7, although it is to be understood that the specific form of control device shown in Figs. 3, 4, and 5 may be employed in connection with the master cylinder illustrated in Fig. 6. In these figures the parts corresponding with those previously described with reference to Figs. 1 to 5 inclusive, are given the same numerals with the addition of 200, to avoid repetition. The main or master actuator is provided with a single acting piston, 203, and the valve mechanism includes only two valves, a suction valve, 240, and an air inlet valve, 241. In this instance the forward end of the cylinder, 201, is connected to the suction pipe, 265, at all times, in the same manner as in the case of the auxiliary actuator cylinder, 301. The particular construction of the master actuator forms no part of the present invention and will not be more particularly described. It will be understood that in the released position of the valve mechanism when the actuator piston, 203, is in its retracted position, the suction valve, 240, will be maintained slightly opened so as to connect the cylinder in rear of the piston with the portion of the cylinder forward of the piston, thereby maintaining an equal state of rarification on both sides of the piston. The cylinder, 201, of the main or master actuator is connected with the pressure operated control mechanism for the auxiliary actuator by the pipe, 297, in the same manner as previously described with reference to Figs. 1 to 5, and the casing, 290, of the control device has its chamber, 293, connected with the auxiliary cylinder, 301, in rear of the piston, by the pipe, 298, the forward portion of said cylinder being connected with the suction pipe, 265a. The pressure actuated control device as shown best in Fig. 7, is also provided with the diaphragm, 291, having the by-pass apertures, 291a, of the total area equaling that area of the connecting device, 297 and 298, and with the higher pressure inlet valve, 299, and by-pass valve, 282, constructed and operating precisely as hereinbefore described. In this instance, however, the suction valve shown in Figs. 3, 4 and 5, is omitted and the by-pass valve, 282, is mounted on the rod or stem, 280, which is also connected with the inlet valve, 299, and forms a continuation of the stem thereof, and merely engages a guiding recess, 292a, in the opposite wall of the casing.

The operation of the apparatus shown in Figs. 6 and 7 in applying the brakes is precisely the same as that previously described. When the operator sufficiently reduces his pressure on the pedal lever, the retracting spring will move the pedal rearwardly, opening the suction valve, 240, after the inlet valve, 241, is closed, connecting the portions of the main cylinder forward and in rear of the piston therein, to produce an equalization and reduction of pressures therein to permit the brake mechanism connected therewith to relieve themselves, and a reduction of pressures in the main cylinder in rear of the piston will be communicated to chamber, 292, of the control device, flexing the diaphragm, in a direction away from the inlet valve, 299, and from the by-pass valve, 282, permitting the inlet valve to close, and opening the by-pass aperture, or apertures, 291b, permitting the air in the rear of the auxiliary piston to be withdrawn to the pipe, 298, chambers, 293 and 292, and the pipe, 297, into the master cylinder in the rear of the piston and therethrough into the suction passage, thereby effecting a reduction of pressure and a perpetual equalization of pressures in the rear of the auxiliary piston and permitting the release of the brake mechanism operated thereby by their retracting means. We do not consider the form of control device illustrated in Fig. 7 as desirable, as that shown in Figs. 3, 4 and 5, for example, as there will be a lag in the release of the auxiliary brake mechanism, due to the fact that the air in rear of the auxiliary piston must pass through the pipe, 297, to the master cylinder, and through the valve mechanism thereof to the suction passage, 265, instead of passing directly into the suction pipe and portion of the auxiliary cylinder forward of the piston connected therewith. This construction may probably necessitate increasing the size of the pipes and the apertures controlled by the master cylinder valves to obtain a satisfactory, quick release of the brakes, but there will be no lag in the application of the brakes, and a lag in their release by the auxiliary actuator would not be as objectionable as if the lag existed in the application of the brakes. The construction illustrated in Fig. 7, however, is a practical embodiment of our invention and will secure some of the advantages thereof.

In Fig. 6 we have shown a check valve, 265c, in the suction pipe, 265a, which is connected to the auxiliary actuator cylinder forward of the piston, at a point corresponding with the location of the check valve, 65c, in Figs. 1 and 2. It will be understood that should the trailer break away from the main vehicle, rupturing the connecting flexible pipes, the check valve will in either case retain the rarification in the auxiliary cylinder forward of the piston, while air will rush into the connecting pipe, 97, (Figs. 1 and 2) or 297

(Fig. 6) increasing the pressure in the diaphragm chamber connected therewith, flexing the diaphragm and opening the air inlet valve in either construction to effect a power stroke of the auxiliary piston and apply the brakes of the trailer and hold them as applied.

The pressure operated control device may be supported in any desired manner adjacent to the auxiliary actuator, either from the chassis or from some part of the actuator, as may be found most convenient. We have shown herein, the control device secured to a bracket from the cylinder head at the forward end of the auxiliary actuator cylinder, but this is not essential.

In some instances it may be found desirable to maintain the diaphragm of the pressure operated device normally seated upon the valve which closes the by-pass apertures so that no air can pass through these apertures when the pressure operated device is in the normal position, and the operation of the auxiliary actuator cylinder or cylinders would only occur when the diaphragm was flexed and the inlet valve of the pressure operated device is opened. We have shown such a construction in Fig. 8, in which the parts corresponding to those in Figs. 3, 4 and 5 are given the same numerals with the addition of 300 to avoid repetition. In this instance a spring, 391$^s$, is interposed between the diaphragm on the side opposite the valve, 382, and the adjacent member of the casing, 390, which spring normally holds the diaphragm in engagement with the valve, 382. This spring is made lighter than the inlet valve spring, 399$^b$, so as not to interfere with the operation of the inlet valve under the action of its spring. The operation of this form of the pressure operated device will be the same as previously described except that a slight pressure would have to be built up within the chamber, 393, sufficient to overcome the pressure of the spring, 391$^s$, before the diaphragm would move away from the valve, 382, to open the by-pass apertures, which, however, would be unimportant, and obviously no air could be admitted to the auxiliary actuator cylinder in rear of its piston except by the opening of the valve, 399.

It will be understood that while the operator operated valve mechanism is shown in this instance as located within the main actuator, the pressure operated control device, herein shown and described, would operate in the same manner if the operator operated valve mechanism is arranged externally of the main actuator cylinder, in the manner shown for example, in our former applications for Letters Patent of the United States, Serial No. 31,281 filed May 19, 1925, Serial No. 163,351 filed January 25, 1927, and Serial No. 94,412 filed March 13, 1926, and also that the pressure operated control device may be connected to any actuator cylinder or cylinders sufficiently remote from the operator operated valve mechanism to make this desirable, as more fully described with reference to Figs. 9 and 10.

It is also obvious that the pressure operated control device itself may be made to operate more than one auxiliary actuator, and in Fig. 2, for example, we have shown the auxiliary actuator cylinder provided with pipes, 110 and 111, connected with portions of the cylinder on opposite sides of the piston, which may be employed for connecting the cylinder, 101, with the corresponding portions of another, or other, actuator cylinders, all of which may be controlled by the pressure operated control device. We have shown these pipes provided with cut off valves, 110$^a$ and 111$^a$, for closing them when not in use.

It will be understood that while the operator operated valve mechanism, as shown in the figures previously described, directly controls a power actuator immediately adjacent to it in addition to controlling a remotely located actuator through the intervention of the pressure operated device, the operator operated control mechanism may be located at a distance from one or more power actuators, and the pressure operated device may be employed adjacent to one or more of such actuators to accelerate the operation thereof in the manner previously described.

The modifications referred to in the preceding paragraphs are illustrated in Fig. 9 of the accompanying drawings, in which the parts corresponding with those shown in Fig. 1 are given the same reference numerals with the addition of 400, to avoid repetition. In this instance the tractor vehicle, indicated at A', is shown provided with a power actuator, indicated at 401, comprising merely a cylinder and piston, and being, for example, of the type illustrated at the right in Fig. 2, the piston being connected by a link, 478, with the rock shaft for operating brake mechanisms, C' and D' of the tractor vehicle, and being in this instance the brake mechanisms for the non-steering wheels. The controlling valve mechanism for the actuator, 401, is located outside of the actuator in linkage between the foot lever, 488, and an auxiliary brake mechanism, represented at H', on the propeller shaft, P, for driving the non-steering wheels through the usual differential gearing, indicated at G'. The valve mechanism may be of any desired type, but is shown in this instance as being of the same construction as that shown in our former application Serial No. 231,724, filed November 27, 1927. The particular construction of this valve mechanism forms no part of our present invention, and we will only refer to it sufficiently to enable the operation to be understood. This exterior valve mechanism comprises a hollow casing indicated at 406, provided with a suction aperture, 406$^a$, and an aperture, 406$^b$, adapted to be connected with the actuator, or actuators, to be controlled on one side of the piston, or pistons thereof. The valve casing has an interior seat, 411, adapted to be engaged by a diaphragm, 408, provided with an aperture or apertures, 419, outside of the valve seat, 411, communicating with the suction aperture. Within the valve casing is a cup shaped disc valve, 410, having an annular flange, 410$^a$, for engaging the diaphragm to make an air tight connection therewith, the disc valve being rigidly connected with a hollow sleeve, 420, provided with an air inlet aperture, 418, outside of the valve casing, and a communicating aperture, 418$^a$, within the space between the disc valve and diaphragm. Briefly stated, when the valve is in its released position, as shown in Fig. 10, the disc valve is pressed against the diaphragm and presses the diaphragm away from the seat, 411, thus connecting the cylinder aperture, 406, with the suction aperture, and the movement of the disc valve in the direction of the arrow Fig. 10, will permit the diaphragm to seat on the seat, 411, closing off communication between the suction and the cylinder aperture, after which the disc valve will move away from the diaphragm and establish communication between the atmosphere or other source of higher fluid pressure and the cylinder aperture, 406. The further movement of the disc valve, 410, will bring it into contact with the valve casing and permit the operator to apply his physical force to any part to be operated, which is connected with the valve casing. The other features of this valve mechanism are fully covered by our former application, and need not be specifically described herein.

In the construction shown in Fig. 9, the suction aperture, 406$^a$, is connected by a pipe, 465$^x$, with the main suction pipe 465, communicating with the suction passage of the engine. The cylinder aperture, 406, of the valve casing, is connected by a pipe, 497, and a branch pipe, 497$^x$, with the cylinder, 401, in rear of the piston, the cylinder forward of the piston being connected with the suction pipe, 465, by a pipe, 465$^y$. The branch pipe, 497$^x$, is provided with a cut off valve, 499$^x$. The valve casing is in this instance connected by a link, 478$^x$, with the brake mechanism, H' of the propeller shaft, and the hollow valve stem, 420, of the valve mechanism is connected to the foot pedal by a link, 479, the retracting spring, 488$a$, holding the valve mechanism normally in the position indicated in Fig. 10.

In Fig. 9 we have also shown a trailing vehicle, indicated at B, provided with its own brake mechanism, indicated at E', F', and an actuator is provided for the trailer brake mechanism constructed substantially as shown at the right in Fig. 2, and indicated at 501, the piston thereof being connected by a lin, 478$a$, with the trailer brake mechanisms. The cylinder pipe, 497, from the exterior valve mechanism, has an extension, 497$a$, containing a flexible portion, 497$b$, and extending to the pressure operated device, indicated as a whole at 490, and which is constructed in this instance as shown in Fig. 8, the opposite side of the pressure operated device being connected with the cylinder, 501, in rear of the piston, by pipe, 498. The suction pipe, 465, also has an extension, 465$a$, containing a flexible portion, 465$b$, between the vehicles and connected to the cylinder, 501, forward of the piston, and also connected to the suction port of the pressure operated device, 490, in the manner hereinbefore described. The pipe, 497$a$, is also provided with a cut-off valve, indicated at 499. The other parts of the apparatus are as previously described.

It will be understood that in the installation illustrated in Fig. 9, the following operations may be effected:—

1. By closing the valves, 499$^x$ and 499, so as to disconnect the valve mechanism from the actuators, 401 and 501, the operator may, by applying his foot to the pedal, 488, and taking up the lost motion between the disc valve, 410, and the valve casing, apply his physical force to the propeller shaft brake mechanism, H', and thereby to the rear wheels of the tractor vehicle.

2. By opening the valve 499$^x$, so as to connect the valve mechanism with the actuator, 401, on the tractor, the operator, by placing his foot on the pedal lever and depressing it, can effect the operation of the actuator, 401, to apply the brake mechanisms, C' and D', of the tractor vehicle by power, and may also apply his physical force to the propeller brake mechanism, H', in addition to the power of the actuator, or in case of failure of power.

3. By opening both the valves, 499, and 499$^x$, the brake mechanisms, E' and F', on the trailer, will be operated substantially simultaneously with the brake mechanisms of the tractor, in the manner previously described, the pressure operated device, 490, acting to prevent material lag in the application of the trailer brakes by the remote actuator, 501, and the operator may apply his physical force to the propeller brake mechanism H', as before described.

4. By closing the valve, 499$^x$, and leaving the valve, 499, open, the operation of the valve mechanism would control the remote power actuator on the trailer through the pressure operated device, and the physical force of the operator could be applied if desired to the propeller shaft brakes of the tractor vehicle. This arrangement would be particularly desirable where the tractor was lightly laden and the trailer very heavily loaded.

It is also obvious that the pressure operated control device would operate in the same manner in connection with other sources of higher and lower fluid pressures, for example, the higher pressure fluid may be compressed fluid at greater than atmospheric pressure, and the lower pressure fluid may be either a partial vacuum, or where the higher pressure fluid is at a pressure greater than atmospheric, atmospheric pressure may be employed at the lower pressure.

It is also obvious that the pressure operated control device would operate any type of power actuator, as for example, actuators employing more than one piston, such as are illustrated in our former application, Serial No. 31,281, filed May 19, 1925, and that it will also operate to control an actuator in which both the piston and cylinder are movably supported with respect to the vehicle, and independently connected with separate parts to be actuated thereby, as shown, for example, in our former application, Serial No. 224,841, filed October 8, 1927.

What we claim and desire to secure by Letters Patent is:—

1. The combination with a main and auxiliary power actuator, each comprising a cylinder closed at both ends, and a piston in each cylinder provided with means for connecting it with a part to be operated, means including main controlling valve mechanism for connecting the main actuator cylinder on opposite sides of its piston with sources of higher and lower fluid pressures, and an operator operated part connected with said main valve mechanism, of a fluid pressure operated device located adjacent to the auxiliary actuator, for operating the auxiliary actuator substantially simultaneously with the main actuator under the control of the main valve mechanism, and comprising a casing, a movable pressure operated member dividing the casing into two chambers, and having portions in sealing engagement with said casing, one of said chambers being connected at all times with the auxiliary actuator cylinder, in rear of the piston therein, the portion of said cylinder on the other side of its piston being in communication at all times with the source of lower fluid pressure, said chamber being provided with an inlet aperture communicating with the source of higher fluid pressure, an inlet valve for said aperture, operative connections between said valve and said movable pressure operated member, and a tubular connection for maintaining communication at all times between the other of said chambers and the portion of the main actuator cylinder in rear of the piston therein.

2. The combination with main and auxiliary power actuators each comprising a cylinder closed at both ends, and a piston in each cylinder provided with means for connecting it with a part to be operated, means including main controlling valve mechanism for connecting the main actuator cylinder on opposite sides of its piston with sources of higher and lower fluid pressures, and an operator operated part connected with said main valve mechanism, of a fluid pressure operated device located adjacent to the auxiliary actuator, for operating the auxiliary actuator substantially simultaneously with the main actuator under the control of the main valve mechanism, and comprising a casing, a movable pressure operated member dividing the casing into two chambers, and having portions in sealing engagement with said casing, one of said chambers being connected at all times with the auxiliary actuator cylinder, in rear of the piston therein, the portion of said cylinder on the other side of its piston being in communication at all times with the source of lower fluid pressure, said chamber being provided with an inlet aperture communicating with the source of higher fluid pressure, an inlet valve for said aperture, said pressure operated device being provided with a by-pass connecting said chambers, a by-pass valve for closing said by-pass, operative connections between said valves and said movable pressure operated member for effecting the opening of one valve after permitting the other to close, by movement of said member in either direction, and a tubular connection for maintaining communication at all times between the other of said chambers and the portion of the main actuator cylinder in rear of the piston therein.

3. The combination with main and auxiliary power actuators, each comprising a cylinder closed at both ends, and a piston in each cylinder provided with means for connecting it with a part to be operated, means including main controlling valve mechanism for connecting the main actuator cylinder on opposite sides of its piston with sources of higher and lower fluid pressures, and an operator operated part connected with said main valve mechanism, of a fluid pressure operated device located adjacent to the auxiliary actuator, for operating the auxiliary actuator substantially simultaneously with the main actuator under the control of the main valve mechanism, and comprising a casing, a movable pressure operated member dividing the casing into two chambers, and having portions in sealing engagement with said casing, one of said chambers being connected at all times with the auxiliary actuator cylinder in rear of the piston therein, the portion of said cylinder on the other side of its piston being in communication at all times with the source of lower fluid pressure, said chamber being provided with an inlet aperture communicating with the source of higher fluid pressure, an inlet valve for said aperture, said movable pressure operated member being provided with a by-pass aperture therethrough connecting said chambers, a by-pass valve for closing said by-pass aperture and disconnecting said chambers, operative connections between said pressure operated member and said valves for effecting the opening of one after permitting the other to close by a movement of said member in either direction, and a tubular connection for maintaining communication at all times between the other of said chambers and the portion of the main actuator cylinder in rear of the piston therein.

4. The combination with main and auxiliary power actuators, each comprising a cylinder closed at both ends, and a piston in each cylinder provided with means for connecting it with a part to be operated, means including main controlling valve mechanism for connecting the main actuator cylinder on opposite sides of its piston with sources of higher and lower fluid pressures, and an operator operated part connected with said main valve mechanism, of a fluid pressure operated device located adjacent to the auxiliary actuator for operating the auxiliary actuator substantially simultaneously with the main actuator under the control of the main valve mechanism, and comprising a casing, a movable pressure operated member dividing the casing into two chambers, and having portions in sealing engagement with said casing, one of said chambers being connected at all times with the auxiliary actuator cylinder, in rear of the piston therein, the portion of said cylinder on the other side of its piston being in communication at all times with the source of lower fluid pressure, said chamber being provided with an inlet aperture communicating with the source of higher fluid pressure, an inlet valve for said aperture, said pressure operated device being provided with a by-pass connecting said chambers, a by-pass valve for controlling said by-pass, the other of said chambers being provided with an outlet aperture communicating with the source of lower fluid pressure, and an outlet valve for said aperture, said inlet and outlet valves being normally closed and said by-pass valve being normally open when the pressures in said chambers are equalized, operative connections between said valves and said movable pressure operated member for effecting the opening of the inlet valve after the closing of the by-pass valve when moved in one direction, and the opening of the outlet valve after the opening of the by-pass valve when moved in the opposite direction, and a tubular connection for maintaining communication at all times between said last mentioned chamber and the portion of the main actuator cylinder in rear of the piston therein.

5. The combination with main and auxiliary power actuators each comprising a cylinder closed at both ends, and a piston in each cylinder provided with means for connecting it with a part to be operated, means including main controlling valve mechanism for connecting the main actuator cylinder on opposite sides of its piston with sources of higher and lower fluid pressures, and an operator operated part connected with said main valve mechanism, of a fluid pressure operated device located adjacent to the auxiliary actuator, for operating the auxiliary actuator substantially simultaneously with the main actuator under the control of the main valve mechanism, and comprising a casing, a movable pressure operated member dividing the casing into two chambers, and having portions in sealing engagement with said casing, one of said chambers being connected at all times with the auxiliary actuator cylinder, in rear of the piston therein, the portion of said cylinder on the other side of its piston being in communication at all times with the source of lower fluid pressure, said chamber being provided with an inlet aperture communicating at all times with the source of lower fluid pressure, said chamber being provided with an inlet aperture communicating with the source of higher fluid pressure, an inlet valve for said aperture, the other of said chambers being provided with an aperture communicating with the auxiliary actuator cylinder forward of the piston, an outlet valve for said aperture, yielding means for holding said inlet and outlet valves normally closed, said pressure operated device being provided with a by-pass for connecting said chambers, a by-pass valve for closing said by-pass, said by-pass valve being maintained in open position and the inlet and outlet valves in closed position when the fluid pressures in said chambers are equalized, operative connections between said movable member and said valves for opening the inlet valve after closing the by-pass valve by a movement in one direction, and for opening the outlet valve after the by-pass valve is opened, by a movement in the other direction, and a tubular connection for maintaining communication at all times between said last mentioned chamber and the portion of the main actuator cylinder in rear of the piston therein.

6. The combination with main and auxiliary power actuators, each comprising a cylinder closed at both ends and a piston in each cylinder provided with means for connecting it with a part to be operated, means including main controlling valve mechanism for connecting the main actuator cylinder on opposite sides of its piston with sources of higher and lower fluid pressures, and an operator operated part connected with said main valve mechanism, of a fluid pressure operated device located adjacent to the auxiliary actuator for operating the auxiliary actuator substantially simultaneously with the main actuator under the control of the main valve mechanism, and comprising a casing, a movable pressure operated member dividing the casing into two chambers and having portions in sealing engagement with the casing, one of said chambers being connected at all times with the auxiliary actuator cylinder in rear of the piston therein, the portion of said cylinder on the other side of the piston being in communication at all times with the source of lower fluid pressure, said chamber being provided with an inlet aperture communicating with the source of higher fluid pressure, an inlet valve for said aperture, said pressure operated member being provided with a by-pass aperture connecting said chamber, a by-pass valve for said aperture, the other of said chambers being provided with an outlet aperture connected with the source of lower fluid pressure and with the auxiliary actuator cylinder forward of the piston therein, an outlet valve for said aperture, yielding means for holding said inlet and outlet valves closed, operative connections between said valves and said pressure operated member for effecting the opening of the inlet valve after the closing of the diaphragm valve when moved in one direction, and the opening of the outlet valve while the by-pass valve is open when moved in the opposite direction, and permitting the inlet and outlet valves to remain closed and the by-pass valve to remain open when the pressures in said chambers are equalized, and a tubular connection for maintaining communication at all times between said last mentioned chamber and the portion of the main actuator cylinder in rear of the piston therein.

7. The combination with main and auxiliary power actuators each comprising a cylinder closed at both ends and a piston in each cylinder provided with means for connecting it with a part to be operated, means including main controlling valve mechanism for connecting the main actuator cylinder on opposite sides of its piston with sources of higher and lower fluid pressures by the operation of said valve mechanism and for connecting said cylinder on opposite sides of its piston with the source of lower fluid pressure when said valve mechanism is in the released or off position, and an operator operated part connected with said main valve mechanism, of a fluid pressure operated device located adjacent to the auxiliary actuator for operating the auxiliary actuator substantially simultaneously with the main actuator under the control of the main valve mechanism, and comprising a casing, a movable pressure operated member dividing the casing into two chambers and having portions in sealing engagement with said casing, one of said chambers being connected at all times with the auxiliary actuator cylinder in rear of the piston, the portion of said cylinder on the other side of the piston being in communication at all times with the source of lower fluid pressure, said chamber being provided with an inlet aperture communicating with the source of higher fluid pressure, an inlet valve for said aperture, said pressure operated device being provided with a by-pass connecting said chambers, a by-pass valve for said by-pass, operative connections between said valves and said movable pressure operated member for opening one after permitting the other to close by a movement of said member in either direction, and maintaining the by-pass valve open and the inlet valve closed when the fluid pressures in said chamber are equalized, and a tubular connection for maintaining communication at all times between the other of said chambers and the portions of the main actuator cylinder in rear of the piston therein, whereby the auxiliary actuator cylinder will be connected with the source of lower fluid pressure on opposite sides of its piston when the main controlling valve mechanism is in the released or off position.

8. The combination with main and auxiliary power actuators each comprising a cylinder closed at both ends and a piston in each cylinder provided with means for connecting it with a part to be operated, means including main controlling valve mechanism for connecting the main actuator cylinder on opposite sides of its piston with sources of higher and lower fluid pressures by the operation of said valve mechanism and for connecting said cylinder on opposite sides of its piston with the source of lower fluid pressure when said valve mechanism is in the released or off position, and an operator operated part connected with said main valve mechansim, of a fluid pressure operated device located adjacent to the auxiliary actuator for operating the auxiliary actuator substantially simultaneously with the main actuator under the control of the main valve mechanism, and comprising a casing, a movable pressure operated member dividing the casing into two chambers and having portions in sealing engagement with said casing, one of said chambers being connected at all times with the auxiliary actuator cylinder in rear of the piston, the portion of said cylinder on the other side of the piston being in communication at all times with the source of lower fluid pressure, said chamber being provided with an inlet aperture communicating with the source of higher fluid pressure, an inlet valve for said aperture, said casing being provided with a by-pass connecting said chambers, a by-pass valve for said by-pass, the other of said chambers being provided with an outlet aperture communicating with the source of lower pressure and with the auxiliary actuator cylinder forward of the piston therein, an outlet valve for said aperture, operative connections between said valves and said movable pressure operated member constructed to open said inlet valve after closing the by-pass valve when moved in one direction, and to open the outlet valve after the by-pass valve is open when moved in the other direction, and permitting the inlet and outlet valves to remain closed and the by-pass valve open when the fluid pressures in said chambers are equalized, and a tubular connection for maintaining communication at all times between said last mentioned chamber and the portion of the main actuator cylinder in rear of the piston therein, whereby the auxiliary actuator cylinder will be connected with the source of lower fluid pressure on opposite sides of its piston when the main controlling valve mechanism is in the released or off position, and the return of the main valve mechanism to normal position after a power stroke of the said pistons will effect an equalization and reduction of pressures in the main and auxiliary actuator cylinders on opposite sides of the piston therein.

9. In brake mechanism for automotive vehicles provided with independently operable brake mechanisms, the combination with a main power actuator comprising a cylinder closed at both ends, a piston in said cylinder provided with means for connecting it with certain of said brake mechanisms, means including main controlling valve mechanism for connecting the main actuator cylinder on opposite sides of its piston with sources of higher and lower fluid pressures by the operation of said valve mechanism and for connecting said cylinder on opposite sides of its piston with the source of lower fluid pressure when said valve mechanism is in the released or off position, and an operator operated part connected with said main valve mechanism, an auxiliary power actuator comprising a cylinder closed at both ends, a piston in said cylinder provided with means for connecting it with other of said brake mechanisms, of a fluid pressure operated device located adjacent to the auxiliary actuator for operating the auxiliary actuator substantially simultaneously with the main actuator under the control of the main valve mechanism, and comprising a casing, a movable pressure operated member dividing the casing into two chambers and having portions in sealing engagement with said casing, one of said chambers being connected at all times with the auxiliary actuator cylinder in rear of the piston, the portion of the cylinder on the other side of the piston being at all times in communication with the source of lower fluid pressure, said chamber being provided with an inlet aperture communicating with the source of higer fluid pressure, an inlet valve connecting said chambers, a by-pass valve for said by-pass, operative for said aperture, said casing being provided with by-pass connections between said valves and said pressure operated member for effecting the opening of one after permitting the other to close when said member is moved in either direction, and a tubular connection for maintaining communication at all times between the other of said chambers and the portion of the main actuator cylinder in rear of the piston therein.

10. In a brake system for automotive vehicles provided with independently operable brake mechanisms, the combination with a main power actuator comprising a cylinder closed at both ends, a piston in said cylinder provided with means for connecting it with certain of said brake mechanisms. means including main controlling valve mechanism for connecting the main actuator cylinder on opposite sides of its piston with sources of higher and lower fluid pressures by the operation of said valve mechanism and for connecting said cylinder on opposite sides of its piston with the source of lower fluid pressure when said valve mechanism is in the released or off position, and an operator operated part connected with said main valve mechanism, an auxiliary power actuator comprising a cylinder closed at both ends, a piston in said cylinder provided with means for connecting it with other of said brake mechanisms, of a fluid pressure operated device located adjacent to the auxiliary actuator for operating the auxiliary actuator substantially simultaneously with the main actuator under the control of the main valve mechanism, and comprising a casing, a movable pressure operated member dividing the casing into two chambers and having portions in sealing engagement with the said casing, one of said chambers being connected at all times with the auxiliary actuator cylinder in rear of the piston, the portion of the cylinder on the other side of the piston being at all times in communication with the source of lower fluid pressure, said chamber being provided with an inlet aperture communicating with the source of higher fluid pressure, an inlet valve for said aperture, said casing being provided with a by-pass connecting said chambers, a by-pass valve for said by-pass, the other of said chambers being provided with an outlet aperture, in communication with the source of lower fluid pressure and with the auxiliary actuator cylinder forward of the piston therein, an outlet valve for said aperture, operative connections between said valves and said movable member for opening the inlet valve after closing the by-pass valve when moved in one direction, and opening the outlet valve after opening the by-pass valve when moved in the other direction, and permitting the inlet and outlet valves to remain in closed position and the by-pass valve in open position when fluid pressures in said chambers are equalized, and a tubular connection for maintaining communication at all times between said last mentioned chamber and the portion of the main actuator cylinder in rear of the piston therein.

11. In a brake system for automotive vehicles provided with an internal combustion engine having a throttle controlled suction passage from the carburetor to the engine cylinders, and provided with independently operable brake mechanisms, the combination with main and auxiliary power actuators each comprising a cylinder closed at both ends and a piston in each cylinder provided with means for connecting it with certain of said brake mechanisms, means including main controlling valve mechanism for connecting the main actuator cylinder on opposite sides of its piston with said suction passage and with a source of higher fluid pressure, and an operator operated part connected with said main valve mechanism, of a fluid pressure operated device located adjacent to the auxiliary actuator, for operating the auxiliary actuator substantially simultaneously with the main actuator under the control of the main valve mechanism, and comprising a casing, a movable pressure operated member dividing the casing into two chambers and having portions in sealing engagement with said casing, one of said chambers being connected at all times with the auxiliary actuator cylinder in rear of the piston therein, the portion of said cylinder on the forward side of the piston being in communication at all times with the suction passage of the engine, said chamber being provided with an inlet aperture communicating with the source of higher fluid presure, an inlet valve for said aperture, said pressure operated device being provided with a by-pass connecting said chambers, a by-pass valve for said by-pass, operative connections between said valves and said movable member for effecting the opening of one valve after permitting the other to close, by a movement of said member in either direction, and permitting the inlet valve to remain closed and the by-pass valve open when the pressures in said chambers are equalized, and a tubular connection for maintaining communication at all times between the other of said chambers and the portion of the main actuator cylinder in rear of the piston therein.

12. In a brake system for automotive vehicles provided with an internal combustion engine having a throttle controlled suction passage from the carburetor to the engine cylinders, and provided with independently operable brake mechanisms, the combination with main and auxiliary power actuators each comprising a cylinder closed at both ends and a piston in each cylinder provided with means for connecting it with certain of said brake mechanisms, means including main controlling valve mechanism for connecting the main actuator cylinder on opposite sides of its piston with said suction passage and with a source of higher fluid pressure, and an operator operated part connected with said main valve mechanism, of a fluid pressure operated device located adjacent to the auxiliary actuator, for operating the auxiliary actuator substantially simultaneously with the main actuator under the control of the main valve mechanism, and comprising a casing, a movable pressure operated member dividing the casing into two chambers and having portions in sealing engagement with said casing, one of said chambers being connected at all times with the auxiliary actuator cylinder in rear of the piston therein, the portion of said cylinder on the forward side of the piston being in communication at all times with the suction passage of the engine, said chamber being provided with an inlet aperture communicating with the source of higher fluid pressure, an inlet valve for said aperture, said pressure operated device being provided with a by-pass connecting said chambers, a by-pass valve for sid by-pass, the other of said chambers being provided with an aperture connected with the suction passage of the engine and with the auxiliary cylinder forward of the piston, a suction valve for said aperture, yielding means for seating said inlet and suction valves, operative connections between said movable member and said valves constructed to effect the opening of the inlet valve after the closing of the by-pass valve when said member is moved in one direction, and the opening of the suction valve while the by-pass valve is open by a movement in the opposite direction, and to permit the by-pass valve to remain open and the suction and inlet valves to remain closed when fluid pressures in said chambers remain equalized, and a tubular connection for maintaining communication at all times between said last mentioned chamber and the portion of the main actuator cylinder in rear of the piston therein.

13. In a brake system for automotive vehicles provided with an internal combustion engine having a throttle controlled suction passage from the carburetor to the engine cylinders, and provided with independently operable brake mechanisms, the combination with main and auxiliary power actuators each comprisng a cylinder closed at both ends and a piston in each cylinder provided with means for connecting it with certain of said brake mechanisms, means including main controlling valve mechanism for connecting the main actuator cylinder on opposite sides of its piston with said suction passage and with a source of higher fluid pressure, and an operator operated part connected with said main valve mechanism, of a fluid pressure operated device located adjacent to the auxiliary actuator, for operating the auxiliary actuator substantially simultaneously with the main actuator under the control of the main valve mechanism, and comprising a casing, a movable pressure operated member dividing the casing into two chambers and having portions in sealing engagement with said casing, one of said chambers being connected at all times with the auxiliary actuator cylinder in rear of the piston therein, the portion of said cylinder on the forward side of the piston being in communication at all times with the suction passage of the engine, said chamber being provided with an inlet aperture communicating with the source of higher fluid pressure, an inlet valve for said aperture, said pressure operated device being provided with a by-pass connecting said chambers, a by-pass valve for said by-pass, the other of said chambers being provided with an aperture connected with the auxiliary cylinder forward of the piston and with the source of suction, a suction valve for said aperture, yielding means for seating said inlet and suction valves, operative connections between said movable member and said valves constructed to effect the opening of the inlet valve after the closing of the by-pass valve when said member is moved in one direction, and the opening of the suction valve while the by-pass valve is opened by a movement in the opposite direction to connect the portion of the auxiliary cylinder on opposite sides of its piston with each other and with the source of suction, and a tubular connection for maintaining communication at all times between said last mentioned chamber and the portion of the main actuator cylinder in the rear of the piston therein, said by-pass valve being constructed to remain open and the suction and inlet valves to remain closed to connect the portions of the main and auxiliary cylinders to the rear of their pistons with each other to equalize the fluid pressures therein, said main valve mechanism being constructed to effect the connection of the portions of the main actuator cylinder on opposite sides of the piston with each other and with the source of suction when in neutral position, to equalize pressures in said cylinder and withdraw air from both portions thereof, whereby the movement of said main valve mechanism to released or off position after a power stroke of the main and auxiliary pistons will effect an equalization and reduction of pressures in the auxiliary actuator cylinder and connect the portions thereof on opposite sides of the piston with the suction passage.

14. In a brake system for automotive vehicles provided with an internal combustion engine having a throttle controlled suction passage from the carburetor to the engine cylinders, and provided with independently operable brake mechanisms, the combination with main and auxiliary power actuators each comprising a cylinder closed at both ends and a piston in each cylinder provided with means for connecting it with certain of said brake mechanisms, means including main controlling valve mechanism for connecting the main actuator cylinder on opposite sides of its piston with said suction passage and with a source of higher fluid pressure, and an operator operated part connected with said main valve mechanism, of a fluid pressure operated device located adjacent to the auxiliary actuator, for operating the auxiliary actuator substantially simultaneously with the main actuator under the control of the main valve mechanism, and comprising a casing, a movable pressure operated member dividing the casing into two chambers and having portions in sealing engagement with said casing, one of said chambers being connected at all times with the auxiliary actuator cylinder in rear of the piston therein, the portion of said cylinder on the forward side of the piston being in communication at all times with the suction passage of the engine, said chamber being provided with an inlet aperture communicating with the source of higher fluid pressure, an inlet valve for said aperture, said pressure operated device being provided with a by-pass connecting said chambers, a by-pass valve for said by-pass, the other of said chambers being provided with an aperture connected with the auxiliary cylinder forward of the piston and with the suction passage of the engine, a suction valve for said aperture, yielding means for seating said inlet and suction valves, operative connections between said movable member and said valves constructed to effect the opening of the inlet valve after the closing of the by-pass valve when said member is moved in one direction, and the opening of the suction valve while the by-pass valve is open by a movement in the opposite direction, and to permit the by-pass valve to remain open and the suction and inlet valves to remain closed when fluid pressures in said chambers remain equalized, and a tubular connection for maintaining communication at all times between said last mentioned chamber and the portion of the main actuator cylinder in rear of the piston therein, said main valve mechanism being constructed to connect the portions of the main cylinder on opposite sides of the piston with each other and with the suction passage of the engine when in neutral position, and means for maintaining said valve mechanism in neutral position to maintain the main actuator piston submerged in vacuum when said piston and valve mechanism are in released position, whereby said auxiliary actuator piston will be maintained likewise submerged in vacuum, and the return of the main valve mechanism to neutral position after a power stroke of both pistons will effect an equalization and reduction of pressures in both main and auxiliary actuator cylinders on opposite sides of the piston therein.

15. In a brake system for automotive vehicles provided with an internal combustion engine having a throttle controlled suction passage from the carburetor to the engine cylinders, and provided with independently operable brake mechanisms, the combination with main and auxiliary power actuators each comprising a cylinder closed at both ends and a piston in each cylinder provided with means for connecting it with certain of said brake mechanisms, means including main controlling valve mechanism for connecting the main actuator cylinder on opposite sides of its piston with said suction passage and with a source of higher fluid pressure, and an operator operated part connected with said main valve mechanism, of a fluid pressure operated device for operating the auxiliary actuator substantially simultaneously with the main actuator under the control of the main valve mechanism, located adjacent to the auxiliary actuator and comprising a casing, a flexible disk dividing the casing into two chambers, and having portions in sealing engagement with said casing, one of said chambers being connected at all times with the auxiliary actuator cylinder in rear of the piston therein, the portion of said cylinder forward of the piston being connected at all times with the suction passage of the engine, said chamber being provided with an inlet aperture communicating with the source of higher fluid pressure, an inlet valve for said aperture, yielding means for holding said valve in closed position, said disk being provided with a by-pass aperture connecting said chambers, a by-pass valve for said by-pass aperture, operative connections between said valves and said disk, for effecting the opening of one valve after permitting the other to close by a movement of said disk in either direction, and permitting the inlet valve to remain closed and the by-pass aperture to remain open when fluid pressures in said chambers are equalized, and a tubular connection from the other of said chambers to the portion of the main actuator cylinder in rear of its piston open at all times for maintaining an equalization and reduction of pressures between the portions of the said main and auxiliary actuator cylinders in rear of the pistons therein through said casing and the said by-pass aperture.

16. In a brake system for automotive vehicles provided with an internal combustion engine having a throttle controlled suction passage from the carburetor to the engine cylinders, and provided with independently operable brake mechanisms, the combination with main and auxiliary power actuators each comprising a cylinder closed at both ends and a piston in each cylinder provided with means for connecting it with certain of said brake mechanisms, means including main controlling valve mechanism for connecting the main actuator cylinder on opposite sides of the piston with said suction passage and with a source of higher fluid pressure, and an operator operated part connected with said main valve mechanism, of a fluid pressure operated device for operating the auxiliary actuator substantially simultaneously with the main actuator under the control of the main valve mechanism, located adjacent to the auxiliary actuator and comprising a casing, a flexible disk dividing the casing into two chambers, and having portions in sealing engagement with said casing, one of said chambers being connected at all times with the auxiliary actuator cylinder in rear of the piston therein, the portion of said cylinder forward of the piston being connected at all times with the suction passage of the engine, said chamber being provided with an inlet aperture communicating with the source of higher fluid pressure, an inlet valve for said aperture, yielding means for holding said valve in closed position, said disk being provided with a by-pass aperture connecting said chambers, a by-pass valve for said by-pass aperture the other of said chambers being provided with an outlet aperture communicating with the auxiliary actuator cylinder forward of the piston and with the suction passage of the engine, an outlet valve for said outlet aperture, yielding means for holding said valve in closed position, said disk being provided with a by-pass aperture connecting said chambers, a by-pass valve for said by-pass aperture, operative connections for effecting the opening of the inlet valve after closing the by-pass valve, by a movement of said disk in one direction and for effecting the opening of the outlet valve after the opening of the by-pass valve by a movement of the disk in the opposite direction, said inlet and outlet valves being permitted to remain closed and the by-pass valve being permitted to remain open, when fluid pressures in said chambers are equalized, and a tubular connection from the last mentioned chamber to the portion of the main actuator cylinder in rear of its piston, open at all times for maintaining an equalization of pressures between the portions of said main and auxiliary cylinders in rear of the pistons therein through said casing and said by-pass aperture.

17. In a brake system for automotive vehicles provided with an internal combustion engine having a throttle controlled suction passage from the carburetor to the engine cylinders and provided with independently operable brake mechanism, the combination with main and auxiliary power actuators each comprising a cylinder closed at both ends and a piston in each cylinder provided with means for connecting it with certain of said brake mechanisms, means including main controlling valve mechanism for connecting the main actuator cylinder on opposite sides of its piston with said suction passage and with a source of higher fluid pressure, and an operator operated part connected with said valve mechanism, of a fluid pressure operated device located adjacent to the auxiliary actuator for operating the auxiliary actuator substantially simultaneously with the main actuator under the control of the main valve mechanism, and comprising a casing, a movable pressure operated member dividing the casing into two chambers and having portions in sealing engagement with said casing, one of said chambers being connected at all times with the auxiliary actuator cylinder in rear of the piston therein, the portion of said cylinder on the forward side of the piston being in communication at all times with the suction passage of the engine, said chamber being provided with an inlet aperture communicating with the source of higher fluid pressure, an inlet valve for said aperture, said pressure operated device being provided with a by-pass connecting said chambers, a by-pass valve for said by-pass, operative connections between said valves and said movable member, for effecting the opening of one valve after permitting the other to close, by a movement of said member in either direction, and permitting the inlet valve to remain closed and the by-pass valve open when the pressures in said chambers are equalized, and a tubular connection for maintaining communication at all times between the other of said chambers and the portion of the main actuator cylinder in rear of the piston therein, the main valve mechanism being connected and movable with the main actuator piston and the brake mechanism connected therewith.

18. In a brake system for automotive vehicles provided with an internal combustion engine having a throttle controlled suction passage from the carburetor to the engine cylinders, and provided with independently operable brake mechanisms, the combination with main and auxiliary power actuators each comprising a cylinder closed at both ends and a piston in each cylinder provided with means for connecting it with certain of said brake mechanisms, means including main controlling valve mechanism for connecting the main actuator cylinder on opposite sides of its piston with said suction passage and with a source of higher fluid pressure, and an operator operated part connected with said main valve mechanism, of a fluid pressure operated device located adjacent to the auxiliary actuator for operating the auxiliary actuator substantially simultaneously with the main actuator under the control of the main valve mechanism, and comprising a casing, a movable pressure operated member dividing the casing into two chambers and having portions in sealing engagement with said casing, one of said chambers being connected at all times with the auxiliary actuator cylinder in rear of the piston therein, the portion of said cylinder on the forward side of the piston being in communication at all times with the suction passage of the engine, said chamber being provided with an inlet aperture communicating with the source of higher fluid pressure, an inlet valve for said aperture, said pressure operated device being provided with a by-pass connecting said chambers, a by-pass valve for said by-pass, the other of said chambers being provided with an aperture connected with the suction passage of the engine and with the auxiliary cylinder forward of the piston, a suction valve for said aperture, yielding means for seating said inlet and said valves constructed to effect the opening of the inlet valve after the closing of the by-pass valve when said member is moved in one direction, and the opening of the suction valve while the by-pass valve is open by a movement in the opposite direction, and to permit the by-pass valve to remain open and the suction and inlet valves to remain closed when fluid pressures in said chambers remain equalized, and a tubular connection for maintaining communication at all times between said last mentioned chamber and the portion of the main actuator cylinder in rear of the piston therein, the main valve mechanism being connected and movable with the main actuator piston and the brake mechanism connected therewith.

19. In a brake system for automotive vehicles provided with an internal combustion engine having a throttle controlled suction passage from the carburetor to the engine cylinders, and provided with independently operable brake mechanisms, the combination with main and auxiliary power actuators each comprising a cylinder closed at both ends and a piston in each cylinder provided with means for connecting it with certain of said brake mechanisms, means including main controlling valve mechanism for connecting the main actuator cylinder on opposite sides of its piston with said suction passage and with a source of higher fluid pressure, and an operator operated part connected with said main valve mechanism, of a fluid pressure operated device located adjacent to the auxiliary actuator for operating the auxiliary actuator substantially simultaneously with the main actuator under the control of the main valve mechanism, and comprising a casing, a movable pressure operated member dividing the casing into two chambers and having portions in sealing engagement with said casing, one of said chambers being connected at all times with the auxiliary actuator cylinder in rear of the piston therein, the portion of said cylinder on the forward side of the piston being in communication at all times with the suction passage of the engine, said chamber being provided with an inlet aperture communicating with the source of higher fluid pressure, an inlet valve for said aperture, said pressure operated device being provided with a by-pass connecting said chambers, a by-pass valve for said by-pass, operative connections between said valves and said movable member for effecting the opening of one valve after permitting the other to close, by a movement of said member in either direction, and permitting the inlet valve to remain closed and the by-pass valve open when the pressures in said chamber are equalized, and a tubular connection for maintaining communication at all times between the other of said chambers and the portion of the main actuator cylinder in rear of the piston therein, said operator operated part being operatively connected with the brake mechanism operated by the main actuator piston by means permitting lost motion for the operation of the valve mechanism for enabling the operator to apply his physical force to said brake mechanisms in addition to the power of the actuator or to apply said brake mechanisms in case of failure of power.

20. In a brake system for automotive vehicles provided with an internal combustion engine having a throttle controlled suction passage from the carburetor to the engine cylinders and provided with independently operable brake mechanisms, the combination with main and auxiliary power actuators each comprising a cylinder closed at both ends and a piston in each cylinder provided with means for connecting it with certain of said brake mechanisms, means including main controlling valve mechanism for connecting the main actuator cylinder on opposite sides of its piston with said suction passage and with a source of higher fluid pressure, and an operator operated part connected with said main valve mechanism, of a fluid pressure operated device located adjacent to the auxiliary actuator for operating the auxiliary actuator substantially simultaneously with the main actuator under the control of the main valve mechanism, and comprising a casing, a movable pressure operated member dividing the casing into two chambers and having portions in sealing engagement with said casing, one of said chambers being connected at all times with the auxiliary actuator cylinder in rear of the piston therein, the portion of said cylinder on the forward side of the piston being in communication at all times with the suction passage of the engine, said chamber being provided with an inlet aperture communicating with the source of higher fluid pressure, an inlet valve for said aperture, said pressure operated device being provided with a by-pass connecting said chambers, a by-pass valve for said by-pass, the other of said chambers being provided with an aperture connected with the suction passage of the engine and with the auxiliary cylinder forward of the piston, a suction valve for said aperture, yielding means for seating said inlet and suction valves, operative connections between said movable member and said valves constructed to effect the opening of the inlet valve after the closing of the by-pass valve when said member is moved in one direction, and the opening of the suction valve while the by-pass valve is open by a movement in the opposite direction, and to permit the by-pass valve to remain open and the suction and inlet valves to remain closed when fluid pressures in said chambers remain equalized, and a tubular connection for maintaining communication at all times between said last mentioned chamber and the portion of the main actuator cylinder in rear of the piston therein, said operator operated part being operatively connected with the brake mechanism operated by the main actuator piston by means permitting lost motion for the operation of the valve mechanism for enabling the operator to apply his physical force to said brake mechanisms, in addition to the power of the actuator or to apply said brake mechanisms in case of failure of power.

21. In a brake system for automotive vehicles provided with an internal combustion engine having a throttle controlled suction passage from the carburetor to the engine cylinders and provided with independently operable brake mechanisms, the combination with main and auxiliary power actuators each comprising a cylinder closed at both ends and a piston in each cylinder provided with means for connecting it with certain of said brake mechanisms, means including main controlling valve mechanism for connecting the main actuator cylinder on opposite sides of its piston with said suction passage and with a source of higher fluid pressure, and an operator operated part connected with said valve mechanism, of a fluid pressure operated device located adjacent to the auxiliary actuator for operating the auxiliary actuator substantially simultaneously with the main actuator under the control of the main valve mechanism, and comprising a casing, a movable pressure operated member dividing the casing into two chambers and having portions in sealing engagement with said casing, one of said chambers being connected at all times with the auxiliary actuator cylinder in rear of the piston therein, the portion of said cylinder on the forward side of the piston being in communication at all times with the suction passage of the engine, said chamber being provided with an inlet aperture communicating with the source of higher fluid pressure, an inlet valve for said aperture, said pressure operated device being provided with a by-pass connecting said chambers, a by-pass valve for said by-pass, operative connections between said valves and said movable member, for effecting the opening of one valve after permitting the other to close, by a movement of said member in either direction, and permitting the inlet valve to remain closed and the by-pass valve open when the pressures in said chambers are equalized, and a tubular connection for maintaining communication at all times between the other of said chambers and the portion of the main actuator cylinder in rear of the piston therein, the main valve mechanism being connected and movable with the main actuator piston and the brake mechanism connected therewith, said operator operated part being connected through said valve mechanism by means providing lost motion with the brake mechanism operated by the main actuator piston, whereby the operator may add his physical force to the brake mechanisms connected with the operator operated part.

22. In a brake system for automotive vehicles provided with an internal combustion engine having a throttle controlled suction passage from the carburetor to the engine cylinders and provided with independently operable brake mechanisms, the combination with main and auxiliary power actuators each comprising a cylinder closed at both ends and a piston in each cylinder provided with means including main controlling valve mechanism for connecting the main actuator cylinder on opposite sides of the piston with said suction passage and with a source of higher fluid pressure, and an operator operated part connected with said main valve mechanism, of a fluid pressure operated device located adjacent to the auxiliary actuator, for operating the auxiliary actuator substantially simultaneously with the main actuator under the control of the main valve mechanism, and comprising a casing, a movable pressure operated member dividing the casing into two chambers and having portions in sealing engagement with said casing, one of said chambers being connected at all times with the auxiliary actuator cylinder in rear of the piston therein, the portion of said cylinder on the forward side of the piston being in communication at all times with the suction passage of the engine, said chamber being provided with an inlet aperture communicating with the source of higher fluid pressure, an inlet valve for said aperture, said pressure operated device being provided with a by-pass connecting said chambers, a by-pass valve for said by-pass, the other of said chambers being provided with an aperture connected with the suction passage of the engine and with the auxiliary cylinder forward of the piston, a suction valve for said aperture, yielding means for seating said inlet and suction valves, connections between the pressure operated member and said valves, constructed to effect the opening of the inlet valve after the closing of the by-pass valve when said member is moved in one direction, and the opening of the suction valve while the by-pass valve is open by a movement in the opposite direction, and to permit the by-pass valve to remain open and the suction and inlet valves to remain closed when fluid pressures in said chambers are equalized, and a tubular connection for maintaining communication at all times between said last mentioned chamber and the portion of the main actuator cylinder in rear of the piston therein, the main valve mechanism being connected and movable with the main actuator piston and the brake mechanism connected therewith, said operator operated part being connected through said main valve mechanism by means providing lost motion with the brake mechanisms operated by the main actuator piston, whereby the operator may add his physical force to the brake mechanisms connected with the operator operated part.

23. The combination with main and auxiliary power actuators, each comprising a cylinder closed at both ends, and a piston in each cylinder provided with means for connecting it with a part to be operated, means including main controlling valve mechanism for connecting the main actuator cylinder on opposite sides of its piston with sources of higher and lower fluid pressures, and an operator operated part connected with said main valve mechanism, of a fluid pressure operated device located adjacent to the auxiliary actuator, for operating the auxiliary actuator substantially simultaneously with the main actuator under the control of the main valve mechanism, and comprising a casing, a movable pressure operated member dividing the casing into two chambers, and having portions in sealing engagement with said casing, one of said chambers being connected at all times with the auxiliary actuator cylinder in rear of the piston therein, the portion of said cylinder on the other side of its piston being in communication at all times with the source of lower fluid pressure, said chamber being provided with an inlet aperture communicating with the source of higher fluid pressure, an inlet valve for said aperture, said movable pressure operated member being provided with a by-pass aperture therethrough connecting said chambers, a by-pass valve for closing said by-pass aperture and disconnecting said chambers, operative connections between said pressure operated member and said valves for effecting the opening of one after permitting the other to close, by a movement of said member in either direction, yielding means engaging said pressure operated member and normally holding it in position to close said by-pass valve, and a tubular connection for maintaining communication at all times between the other of said chambers and the portion of the main actuator cylinder in rear of the piston therein.

24. The combination with main and auxiliary power actuators, each comprising a cylinder closed at both ends, and a piston in each cylinder provided with means for connecting it with a part to be operated, means including main-controlling valve mechanism for connecting the main actuator cylinder on opposite sides of its piston with sources of higher and lower fluid pressures, and an operator operated part connected with said main valve mechanism, of a fluid pressure operated device located adjacent to the auxiliary actuator, for operating the auxiliary actuator substantially simultaneously with the main actuator under the control of the main valve mechanism, and comprising a casing, a movable pressure operated member dividing the casing into two chambers, and having portions in sealing engagement with said casing, one of said chambers being connected at all times with the auxiliary actuator cylinder in rear of the piston therein, the portion of said cylinder on the other side of the piston being in communication at all times with the source of lower fluid pressure, said chamber being provided with an inlet aperture communicating with the source of higher fluid pressure, an inlet valve for said aperture, the other chamber being provided with an outlet aperture communicating with the source of lower fluid pressure, an outlet valve for said aperture, springs for seating said valves, said movable pressure operated member being provided with a by-pass aperture therethrough connecting said chambers, a by-pass valve for closing said by-pass aperture and disconnecting said chambers, the normal position of said pressure operated member, when pressures on its opposite faces are equalized, tending to maintain the by-pass valve in open position, and a spring engaging the pressure operated member and normally holding it in position to close the by-pass aperture, and connections between the pressure operated member and said valves constructed to effect the opening of the outlet valve after the opening of the by-pass valve by movement of the pressure operated device in one direction, and the opening of the inlet valve after the closing of the outlet valve and the by-pass valve by movement in the opposite direction, and a tubular connection for maintaining communication at all times between the chamber, provided with the outlet aperture and the portion of the main actuator cylinder in rear of the piston therein.

25. In brake mechanism for automotive vehicles, the combination with a power actuator comprising a cylinder closed at both ends, and a piston in said cylinder provided with means for connecting it with brake mechanism of the vehicle, a fluid pressure operated device located adjacent to said actuator and comprising a casing, a movable pressure operated member dividing the casing into two chambers and having portions in sealing engagement with the said casing, one of said chambers being connected at all times with said actuator cylinder in rear of the piston, means for connecting the cylinder on the other side of the piston with the source of lower fluid pressure, said chamber being provided with an inlet aperture communicating with the source of higher fluid pressure, an inlet valve for said aperture, said casing being provided with a by-pass connecting said chambers, a by-pass valve for said by-pass, operative connections between said valves and said pressure operated member for effecting the opening of one after permitting the other to close when said member is moved in either direction, of controlling valve mechanism located at a distance from said actuator, connections from said controlling valve mechanism to sources of higher and lower fluid pressures, an operator operated part connected with said controlling valve mechanism, and a tubular connection for maintaining communication at all times between said controlling valve mechanism and the pressure operated device on the opposite side of said pressure operated member from said inlet aperture.

26. In brake mechanism for automotive vehicles, the combination with a power actuator comprising a cylinder closed at both ends, and a piston in said cylinder provided with means for connecting it with brake mechanism of the vehicle, a fluid pressure operated device located adjacent to said actuator and comprising a casing, a movable pressure operated member dividing the casing into two chambers and having portions in sealing engagement with said casing, one of said chambers being connected at all times with said actuator cylinder in rear of the piston, means for connecting the cylinder on the other side of the piston with the source of lower fluid pressure, said chamber being provided with an inlet aperture communicating with the source of higher fluid pressure, an inlet valve for said aperture, the other of said chambers being provided with an outlet aperture connected with the source of lower fluid pressure, an outlet valve for said aperture, said casing being provided with a by-pass connecting said chambers, a by-pass valve for said by-pass, operative connections between said valves and said pressure operated member for effecting the opening of the inlet valve after the closing of the by-pass valve when moved in one direction, and the opening of the outlet valve while the by-pass valve is opened, by a movement in the opposite direction, and to permit both the inlet and outlet valves to remain closed when fluid pressures in said chambers are equalized, of controlling valve mechanism located at a distance from said actuator, connections from said controlling valve mechanism to sources of higher and lower fluid pressures, an operator operated part connected with said valve mechanism, and a tubular connection for maintaining communication at all times between the chamber provided with said outlet aperture and said controlling valve mechanism.

27. In brake mechanism for automotive vehicles including a tractor and a trainler, the combination with a power actuator mounted on the trailer and comprising a cylinder closed at both ends, and a piston in said cylinder provided with means for connecting it with brake mechanism for the trailer, a fluid pressure operated device located adjacent to said actuator and comprising a casing, a movable pressure operated member dividing the casing into two chambers and having portions in sealing engagement with the said casing, one of said chambers being connected at all times with said actuator cylinder in rear of the piston, means for connecting the cylinder on the other side of the piston with the source of lower fluid pressure, said chamber being provided with an inlet aperture communicating with the source of higher fluid pressure, an inlet valve for said aperture, said casing being provided with a by-pass connecting said chambers, a by-pass valve for said by-pass, operative connections between said valves and said pressure operated member for effecting the opening of one after permitting the other to close when said member is moved in either direction, of controlling valve mechanism located on the tractor, connections from said controlling valve mechanism to sources of higher and lower fluid pressure, an operator operated part on the tractor connected with said valve mechanism, and a tubular connection for maintaining communication at all times between the other of said chambers of the pressure operated device on the trailer and said controlling valve mechanism on the tractor.

28. In brake mechanism for automotive vehicles including a tractor and a trailer, the combination with a power actuator mounted on the trailer and comprising a cylinder closed at both ends, and a piston in said cylinder provided with means for connecting it with brake mechanism for the trailer, a fluid pressure operated device located adjacent to said actuator and comprising a casing, a movable pressure operted member dividing the casing into two chambers and having portions in sealing engagement with the said casing, one of said chambers being connected at all times with said actuator cylinder in rear of the piston, means for connecting the cylinder on the other side of the piston with the source of lower fluid pressure, said chamber being provided with an inlet aperture communicating with the source of higher fluid pressure, an inlet valve for said aperture, the other of said chambers being provided with an outlet aperture communicating with the source of lower fluid pressure, an outlet valve for said aperture, said casing being provided with a by-pass connecting said chambers, a by-pass valve for said by-pass, operative connections between said valves and said pressure operated member for effecting the opening of the inlet valve after the closing of the by-pass valve when said member is moved in one direction, and the opening of the outlet valve while the by-pass valve is open, by a movement in the opposite direction, and to permit the inlet and outlet valves to remain closed when fluid pressures in said chambers are equalized, of controlling valve mechanism located on the tractor, connections from said controlling valve mechanisms to sources of higher and lower fluid pressures, an operator operated part on the tractor connected with said controlling valve mechanism, and a tubular connection for maintaining communication at all times between said controlling valve mechanism and the chamber of the pressure operated device provided with said outlet aperture.

29. In brake mechanism for automotive vehicles provided with an internal combustion engine for propelling the same, having a throttle controlled suction passage from the carburetor to the engine cylinder, the combination with a power actuator comprising a cylinder closed at both ends, and a piston in said cylinder provided with means for connecting it with brake mechanism of the vehicle, a fluid pressure operated device located adjacent to said actuator and comprising a casing, a movable pressure operated member dividing the casing into two chambers and having portions in sealing engagement with said casing, one of said chambers being connected at all times with said actuator cylinder in rear of the piston, means for connecting the cylinder on the other side of the piston with the suction passage of the engine, said chamber being provided with an inlet aperture communicating with the atmosphere, an inlet valve for said aperture, said casing being provided with a by-pass connecting said chambers, a by-pass valve for said by-pass, operative connections between said valves and said pressure operated member for effecting the opening of one after permitting the other to close when said members move in either direction, of controlling valve mechanism located at a distance from said actuator, connections from said controlling valve mechanism to the suction passage of the engine and to the atmosphere, an operator operated part connected with said controlling valve mechanism, and a tubular connection for maintaining communication at all times between said controlling valve mechanism and the chamber of said pressure operated device on the opposite side of the pressure operated member for said inlet aperture.

30. In brake mechanism for automotive vehicles provided with an internal combustion engine for propelling the same, having a throttle controlled suction passage from the carburetor to the engine cylinder, the combination with a power actuator comprising a cylinder, closed at both ends, and a piston in said cylinder provided with means for connecting it with brake mechanism of the vehicle, a fluid pressure operated device located adjacent to said actuator and comprising a casing, a movable pressure operated member dividing the casing into two chambers and having portions in sealing engagement with said casing, one of said chambers being connected at all times with said actuator cylinder in rear of the piston, means for connecting the cylinder on the other side of the piston with the suction passage of the engine, said chamber being provided with an inlet aperture communicating with the atmosphere, an inlet valve for said aperture, the other of said chambers being provided with a suction outlet aperture, a suction valve for said aperture, said casing being provided with a by-pass connecting said chambers, a by-pass valve for said by-pass, operative connections between said valves and said pressure operated member for effecting the opening of the inlet valve after the closing of the by-pass valve, when said member is moved in one direction, and the opening of the suction valve while the by-pass valve is open, by movement in the opposite direction, and to permit the inlet and suction valves to remain closed when fluid pressures in said chambers are equalized, of controlling valve mechanism located at a distance from said actuator, connections from said controlling valve mechanism to said suction passage and to the atmosphere, an operator operated part connected with said controlling valve mechanism, and a tubular connection for maintaining communication at all times between said controlling valve mechanism and the chamber of the pressure operated device provided with said suction outlet aperture.

31. In brake mechanism for automotive vehicles including a tractor, provided with an internal combustion engine having a throttle controlled suction passage between its carburetor and the engine cylinders, and a trailer, the combination with a power actuator mounted on the trailer, comprising a cylinder closed at both ends, and a piston in said cylinder provided with means for connecting it with brake mechanism of the trailer, a fluid pressure operated device located adjacent to said actuator and comprising a casing, a movable pressure operated member dividing the casing into two chambers and having portions in sealing engagement with said casing, one of said chambers being connected at all times with said actuator cylinder in rear of the piston, means for connecting the cylinder on the other side of the piston with a suction passage of the engine, said chamber being provided with an inlet aperture communicating with the atmosphere, an inlet valve for said aperture, said casing being provided with a by-pass connecting said chambers, a by-pass valve for said by-pass, operative connections between said valve and said pressure operated member for effecting the opening of one after permitting the other to close when said member is moved in either direction, of controlling valve mechanism located on the tractor, connections from said controlling valve mechanism to the suction passage of the engine and to the atmosphere, an operator operated part connected with said controlling valve mechanism, and a tubular connection for maintaining communication at all times between said controlling valve mechanism and the chamber of the pressure operated device on the opposite side of said pressure operated member from said inlet aperture.

32. In brake mechanism for automotive vehicles including a tractor, provided with an internal combustion engine having a throttle controlled suction passage between its carburetor and the engine cylinders, and a trailer, the combination with a power actuator mounted on the trailer, comprising a cylinder closed at both ends, and a piston in said cylinder provided with means for connecting it with brake mechanism of the trailer, a fluid pressure operated device located adjacent to said actuator and comprising a casing, a movable pressure operated member dividing the casing into two chambers and having portions in sealing engagement with said casing, one of said members being connected at all times with said actuator cylinder in rear of the piston, means for connecting the cylinder on the other side of the piston with a suction passage of the engine, said chamber being provided with an inlet aperture communicating with the atmosphere, an inlet valve for said aperture, the other of said chambers being provided with a suction outlet aperture, a suction valve for said aperture, said casing being provided with a by-pass connecting said chambers, a by-pass valve for said by-pass, operative connections between said valves and said pressure operated member for effecting the opening of said inlet valve after the closing of the by-pass valve when said member is moved in one direction, and the opening of the suction valve while the by-pass valve is open by movement in the opposite direction, and to permit the suction and inlet valves to remain closed when fluid pressures in said chambers are equalized, of controlling valve mechanism located on the tractor, connections from said controlling valve mechanism to the suction passage of the engine and to the atmosphere, an operator operated part on the tractor connected with said controlling valve mechanism, and a tubular connection for maintaining communication at all times between said controlling valve mechanism and the chamber of said pressure operated device, provided with said suction outlet aperture.

33. In a braking system for automotive vehicles having independent brake mechanisms, the combination with two power actuators operating on differentials of fluid pressure, means including controlling valve mechanism associated with one of the actuators for connecting the same with sources of differential fluid pressure, of a fluid pressure operated device associated with the other actuator for operating the same substantially simultaneously with the first actuator under control of the valve mechanism, and comprising a casing, a pressure actuated member dividing the casing into separate chambers, one of which is connected at all times to the second actuator in rear of a piston therein, a connection from the other chamber to the source of low fluid pressure, means for connecting the first of said chambers with the source of higher fluid pressure, and means for connecting the second of said chambers with the first actuator.

34. In a braking system for automotive vehicles having independent brake mechanisms, the combination with two power actuators operating on differentials of fluid pressure, means including controlling valve mechanism associated with one of the actuators for connecting the same with sources of differential fluid pressure, of a fluid pressure operated device associated with the other actuator for operating the same substantially simultaneously with the first actuator under control of the valve mechanism, and comprising a casing, a pressure actuated member dividing the casing into separate chambers, one of which is connected at all times to the second actuator in rear of a piston therein, a connection from the other chamber to the source of low fluid pressure, means for connecting the first of said chambers with the source of higher fluid pressure, means for connecting the second of said chambers with the first actuator, and an operator operated part for controlling said valve mechanism, which is connected to certain of the brake mechanisms.

In testimony whereof we affix our signatures.

CALEB S. BRAGG.
VICTOR W. KLIESRATH.